(12) United States Patent
Roberts et al.

(10) Patent No.: US 11,693,775 B2
(45) Date of Patent: *Jul. 4, 2023

(54) ADAPTIVE CACHE

(71) Applicant: Micron Technology, Inc., Boise, ID (US)

(72) Inventors: David Andrew Roberts, Wellesley, MA (US); Joseph Thomas Pawlowski, Boise, ID (US)

(73) Assignee: Micron Technologies, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/657,922

(22) Filed: Apr. 4, 2022

(65) Prior Publication Data

US 2022/0222180 A1 Jul. 14, 2022

Related U.S. Application Data

(63) Continuation of application No. 16/880,248, filed on May 21, 2020, now Pat. No. 11,294,808.

(51) Int. Cl.
  *G06F 12/0815* (2016.01)
  *G06F 12/0804* (2016.01)
  *G06F 12/0864* (2016.01)

(52) U.S. Cl.
  CPC ...... *G06F 12/0815* (2013.01); *G06F 12/0804* (2013.01); *G06F 12/0864* (2013.01); *G06F 2212/1044* (2013.01)

(58) Field of Classification Search
  None
  See application file for complete search history.

(56) References Cited

U.S. PATENT DOCUMENTS

| | | | |
|---|---|---|---|
| 5,652,858 A | 7/1997 | Okada et al. |
| 5,721,874 A | 2/1998 | Carnevale et al. |
| 5,809,566 A | 9/1998 | Charney et al. |
| 6,557,079 B1 | 4/2003 | Mason et al. |

(Continued)

FOREIGN PATENT DOCUMENTS

| | | |
|---|---|---|
| KR | 20170028228 | 3/2017 |
| WO | 2021236800 | 11/2021 |
| WO | 2021257281 | 12/2021 |

OTHER PUBLICATIONS

"Advisory Action", U.S. Appl. No. 16/901,890, dated Dec. 6, 2021, 3 pages.

(Continued)

*Primary Examiner* — Kaushikkumar M Patel
(74) *Attorney, Agent, or Firm* — Colby Nipper PLLC

(57) ABSTRACT

Described apparatuses and methods form adaptive cache lines having a configurable capacity from hardware cache lines having a fixed capacity. The adaptive cache lines can be formed in accordance with a programmable cache-line parameter. The programmable cache-line parameter can specify a capacity for the adaptive cache lines. The adaptive cache lines may be formed by combining respective groups of fixed-capacity hardware cache lines. The quantity of fixed-capacity hardware cache lines included in respective adaptive cache lines may be based on the programmable cache-line parameter. The programmable cache-line parameter can be selected in accordance with characteristics of the cache workload.

18 Claims, 14 Drawing Sheets

(56) References Cited

U.S. PATENT DOCUMENTS

| | | |
|---|---|---|
| 6,560,676 B1 | 5/2003 | Nishimoto et al. |
| 6,728,840 B1 | 4/2004 | Shatil et al. |
| 7,434,004 B1 | 10/2008 | Spracklen et al. |
| 7,774,550 B2 | 8/2010 | Nomura et al. |
| 7,873,791 B1 | 1/2011 | Yu |
| 9,110,677 B2 | 8/2015 | Chinnaanangur et al. |
| 9,767,028 B2 | 9/2017 | Cheng et al. |
| 9,769,030 B1 | 9/2017 | Ramalingam et al. |
| 9,886,385 B1 | 2/2018 | Huberty et al. |
| 9,904,624 B1 | 2/2018 | Huberty et al. |
| 9,971,694 B1 | 5/2018 | Meier et al. |
| 10,001,927 B1 | 6/2018 | Trachtman et al. |
| 10,180,905 B1 | 1/2019 | Meier et al. |
| 10,331,567 B1 | 6/2019 | Meier et al. |
| 10,346,309 B1 | 7/2019 | Hakewill et al. |
| 10,452,551 B2 | 10/2019 | Venkatesh et al. |
| 11,294,808 B2 | 4/2022 | Roberts et al. |
| 11,507,516 B2 | 11/2022 | Roberts et al. |
| 2002/0087800 A1 | 7/2002 | Abdallah et al. |
| 2004/0049642 A1 | 3/2004 | Liang |
| 2004/0123043 A1 | 6/2004 | Rotithor et al. |
| 2005/0081014 A1 | 4/2005 | Tran et al. |
| 2006/0053256 A1 | 3/2006 | Moyer et al. |
| 2006/0179238 A1 | 8/2006 | Griswell et al. |
| 2006/0179239 A1 | 8/2006 | Fluhr et al. |
| 2006/0248279 A1 | 11/2006 | Al-Sukhni et al. |
| 2006/0248280 A1 | 11/2006 | Al-Sukhni et al. |
| 2006/0248281 A1 | 11/2006 | Al-Sukhni et al. |
| 2007/0005934 A1 | 1/2007 | Rotithor et al. |
| 2007/0043908 A1 | 2/2007 | Diefendorff |
| 2008/0005466 A1 | 1/2008 | Lubbers et al. |
| 2008/0209130 A1 | 8/2008 | Kegel et al. |
| 2009/0006813 A1 | 1/2009 | Singhal et al. |
| 2009/0063777 A1 | 3/2009 | Usui |
| 2009/0172293 A1 | 7/2009 | Sun |
| 2010/0228941 A1 | 9/2010 | Koob et al. |
| 2010/0306222 A1 | 12/2010 | Freedman et al. |
| 2011/0173398 A1 | 7/2011 | Boyle et al. |
| 2011/0219208 A1 | 9/2011 | Sameh et al. |
| 2012/0054443 A1* | 3/2012 | Nakra ............ G06F 12/0864 711/E12.001 |
| 2012/0124318 A1 | 5/2012 | Bivens et al. |
| 2012/0144125 A1 | 6/2012 | Greiner et al. |
| 2012/0278560 A1 | 11/2012 | Benzion et al. |
| 2013/0013867 A1 | 1/2013 | Manne et al. |
| 2013/0138892 A1 | 5/2013 | Loh et al. |
| 2013/0166874 A1 | 6/2013 | Auernhammer et al. |
| 2013/0238861 A1 | 9/2013 | Manne et al. |
| 2014/0028693 A1 | 1/2014 | Wang et al. |
| 2014/0149678 A1 | 5/2014 | Chaudhary |
| 2014/0181415 A1 | 6/2014 | Loh et al. |
| 2014/0379994 A1 | 12/2014 | Yoshikawa et al. |
| 2015/0143057 A1 | 5/2015 | Pavlou et al. |
| 2015/0234663 A1 | 8/2015 | Chishti et al. |
| 2015/0234746 A1 | 8/2015 | Jo |
| 2015/0356014 A1 | 12/2015 | Sathish et al. |
| 2016/0055088 A1 | 2/2016 | Zhang et al. |
| 2016/0062894 A1 | 3/2016 | Schwetman et al. |
| 2016/0154750 A1 | 6/2016 | Park et al. |
| 2016/0227236 A1 | 8/2016 | Matsumoto et al. |
| 2016/0364146 A1 | 12/2016 | Kuttner et al. |
| 2016/0371187 A1 | 12/2016 | Roberts |
| 2016/0378668 A1 | 12/2016 | Roberts |
| 2017/0116118 A1 | 4/2017 | Artieri et al. |
| 2017/0142217 A1 | 5/2017 | Misra et al. |
| 2017/0192887 A1 | 7/2017 | Herdrich et al. |
| 2017/0212837 A1 | 7/2017 | Breternitz |
| 2017/0300416 A1 | 10/2017 | Yamamura |
| 2017/0344880 A1 | 11/2017 | Nekuii |
| 2018/0018266 A1 | 1/2018 | Jones |
| 2018/0024836 A1 | 1/2018 | Gschwind et al. |
| 2018/0089087 A1 | 3/2018 | Chang et al. |
| 2018/0285278 A1 | 10/2018 | Appu et al. |
| 2018/0341592 A1 | 11/2018 | Drerup et al. |
| 2018/0349288 A1 | 12/2018 | Vakharwala et al. |
| 2019/0057300 A1 | 2/2019 | Mathuriya et al. |
| 2019/0087341 A1 | 3/2019 | Pugsley et al. |
| 2019/0258579 A1 | 8/2019 | Carey et al. |
| 2019/0317901 A1 | 10/2019 | Kachare et al. |
| 2019/0324932 A1 | 10/2019 | Srinivas et al. |
| 2020/0004685 A1 | 1/2020 | Guim Bernat et al. |
| 2020/0081848 A1 | 3/2020 | Bae et al. |
| 2020/0349080 A1 | 11/2020 | Radi et al. |
| 2021/0034528 A1 | 2/2021 | Karve et al. |
| 2021/0034529 A1 | 2/2021 | Karve et al. |
| 2021/0073133 A1 | 3/2021 | Sharon et al. |
| 2021/0089457 A1 | 3/2021 | Park et al. |
| 2021/0365376 A1 | 11/2021 | Roberts et al. |
| 2021/0390053 A1 | 12/2021 | Roberts |
| 2022/0019530 A1 | 1/2022 | Roberts |
| 2022/0019537 A1 | 1/2022 | Roberts |
| 2022/0058132 A1 | 2/2022 | Roberts et al. |
| 2023/0052043 A1 | 2/2023 | Roberts |
| 2023/0088638 A1 | 3/2023 | Roberts |

OTHER PUBLICATIONS

"Final Office Action", U.S. Appl. No. 16/901,890, dated Sep. 27, 2021, 29 pages.
"Final Office Action", U.S. Appl. No. 16/937,671, dated Nov. 16, 2021, 16 pages.
"Final Office Action", U.S. Appl. No. 16/928,932, dated Nov. 18, 2021, 21 pages.
"International Search Report and Written Opinion", Application No. PCT/US2021/033210, dated Sep. 3, 2021, 10 pages.
"International Search Report and Written Opinion", Application No. PCT/US2021/035535, dated Sep. 10, 2021, 10 pages.
"Non-Final Office Action", U.S. Appl. No. 16/901,890, dated Feb. 17, 2022, 33 pages.
"Non-Final Office Action", U.S. Appl. No. 16/937,671, dated Jun. 23, 2021, 14 pages.
"Non-Final Office Action", U.S. Appl. No. 16/928,932, dated Jun. 28, 2021, 20 pages.
"Non-Final Office Action", U.S. Appl. No. 16/880,248, dated Jul. 9, 2021, 15 pages.
"Non-Final Office Action", U.S. Appl. No. 16/901,890, dated Jul. 9, 2021, 26 pages.
"Notice of Allowance", U.S. Appl. No. 16/928,932, dated Mar. 22, 2022, 9 pages.
"Notice of Allowance", U.S. Appl. No. 16/880,248, dated Nov. 24, 2021, 6 pages.
"Radix Tree", retrieved from https://en.wikipedia.org/wiki/Radix_tree on Jan. 27, 2020, 8 pages.
Bakhshalipour, et al., "Domino Temporal Data Prefetcher", Proceedings of the 24th International Symposium on High-Performance Architecture (HPCA); Department of Computer Engineering, Sharif Universtity of Technology; School of Computer Science, Institute for Research in Fundamental Sciences (IPM); IEEE, Feb. 2018, 12 pages.
Gervasi, "Overcoming System Memory Challenges with Persistent Memory and NVDIMM-P", JEDEC Server Forum 2017, Jan. 2017, 14 pages.
Hashemi, et al., "Learning Memory Access Patterns", retrieved from https://arxiv.org/pdf/1803.02329.pdf on Jan. 27, 2020, Mar. 6, 2018, 15 pages.
Huang, et al., "Open Prefetch—Let There Be Industry-Competitive Prefetching in RISC-V Processors", Institute of Computing Technology (ICT); Chinese Academy of Sciences (CAS); Retrieved from https://content.riscv.org/wp-content/uploads/2018/07/Shanghai-1350_OpenPrefetch.pdf on Jan. 27, 2020, 20 pages.
Madan, et al., "Optimizing Communication and Capacity in a 3D Stacked Reconfigurable Cache Hierarchy", Jan. 2008, pp. 262-273.
Nesbit, et al., "AC/DC: An Adaptive Data Cache Prefetcher", Jan. 2004, 11 pages.
Rothman, et al., "Sector Cache Design and Performance", Report No. UCB/CSD-99-1034; Computer Science Division (EECS); University of California, Jan. 1999, 63 pages.

(56) References Cited

OTHER PUBLICATIONS

Salkhordeh, et al., "ReCA: An Efficient Reconfigurable Cache Architecture for Storage Systems with Online Workload Characterization", May 3, 2018, 14 pages.

Shi, et al., "Dynamic Page Size Adjustment in Operating System", IEEE; 2016 International Conference on Information System and Artificial Intelligence, Jun. 2016, 5 pages.

Zhang, et al., "A Self-Tuning Cache Architecture for Embedded Systems", May 2004, pp. 407-425.

"Notice of Allowance", U.S. Appl. No. 16/937,671, dated Apr. 13, 2022, 21 pages.

"Notice of Allowance", U.S. Appl. No. 16/997,811, dated Jul. 13, 2022, 9 pages.

"International Preliminary Report on Patentability", Application No. PCT/US2021/033210, dated Nov. 17, 2022, 7 pages.

\* cited by examiner

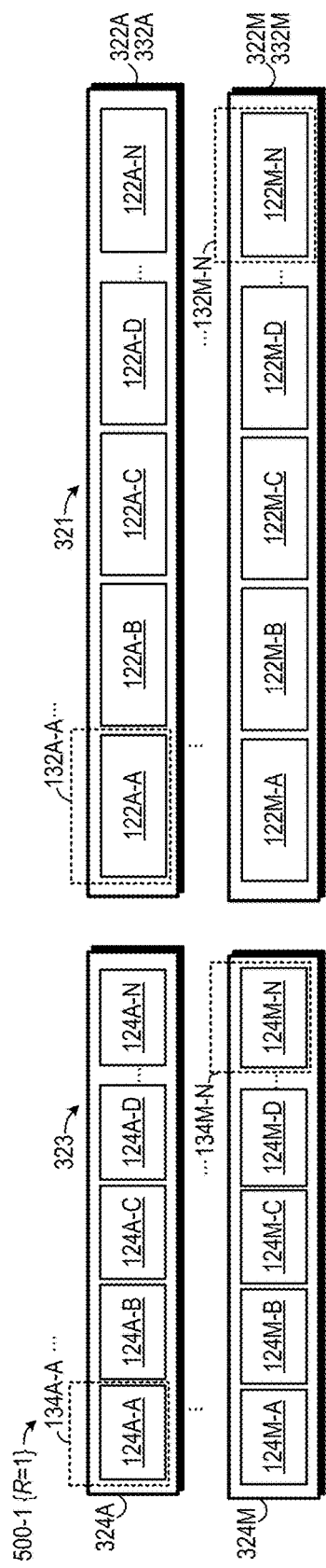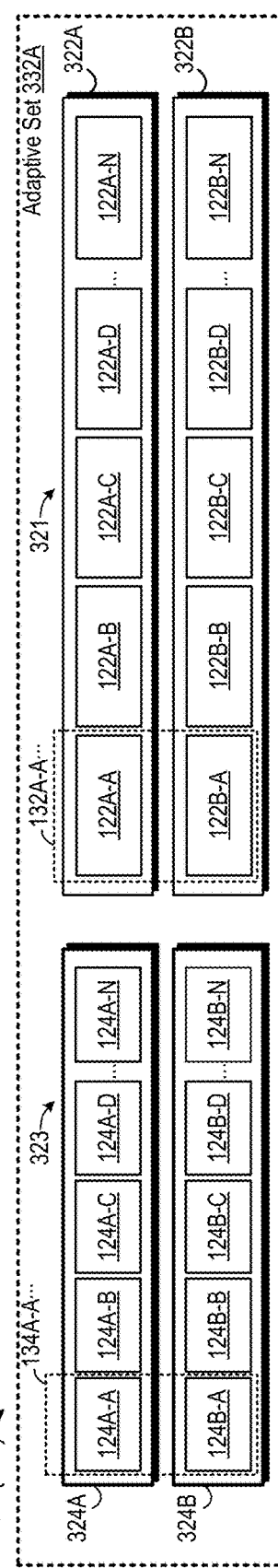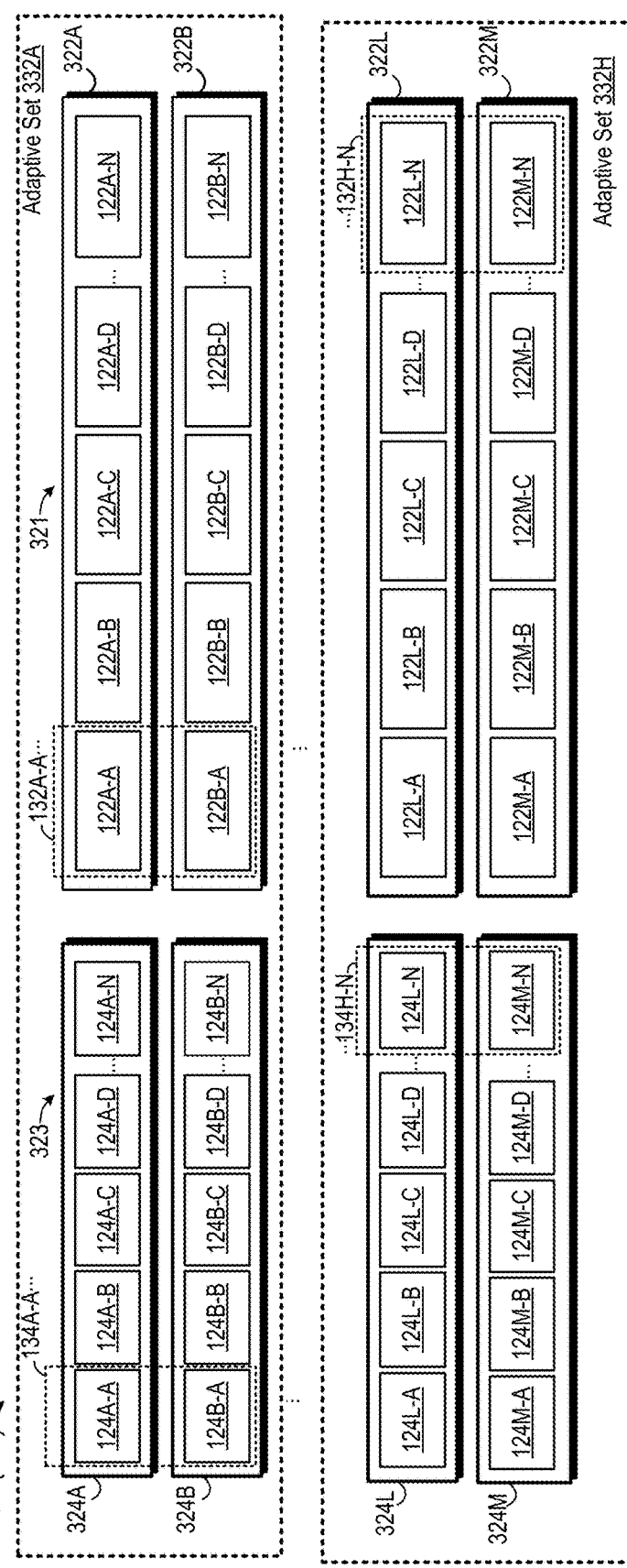

ADAPTIVE CACHE

RELATED APPLICATION(S)

This application is a continuation of and claims priority to U.S. Non-Provisional patent application Ser. No. 16/880,248, filed on May 21, 2020, the disclosure of which is incorporated by reference herein in its entirety.

BACKGROUND

To operate efficiently, some computing systems include multiple levels of memory, which is called a hierarchical memory system. Here, efficient operation implies cost efficiency and speed efficiency. Faster memories are typically more expensive than relatively slower memories, so designers attempt to balance their relative costs and benefits. One approach is to use a smaller amount of faster memory with a larger amount of slower memory. The faster memory is deployed at a higher level than the slower memory such that the faster memory is accessed first. An example of a relatively faster memory is called a cache memory. An example of a relatively slower memory is a backing memory, which can include primary memory, main memory, backing storage, or the like. A cache memory can therefore accelerate data operations by storing and retrieving data of the backing memory using high-performance memory cells. The high-performance memory cells enable the cache to respond to memory requests from a program more quickly than backing memory. Hierarchical memory systems can therefore be employed to balance system performance versus cost. Unfortunately, hierarchical memory systems can also introduce operational complexity that engineers and other computer designers strive to overcome.

BRIEF DESCRIPTION OF THE DRAWINGS

The details of one or more aspects of an adaptive cache are described in this document with reference to the following drawings. The same numbers are used throughout the drawings to reference like features and components:

FIGS. 1-1 through 1-8 illustrate example environments in which techniques for an adaptive cache can be implemented.

FIG. 2 illustrates example operational implementations of an adaptive cache as disclosed herein.

FIG. 3 illustrates further example operational implementations of an adaptive cache as disclosed herein.

FIG. 4 illustrates examples of intra-set adaptive cache schemes.

FIGS. 5-1 and 5-2 illustrate further examples of intra-set adaptive cache schemes.

FIGS. 6-1 and 6-2 illustrate further example operational implementations of an adaptive cache as disclosed herein.

FIGS. 7-1 and 7-2 illustrate further example operational implementations of an adaptive cache having sectored hardware cache lines as disclosed herein.

FIG. 8 illustrates further example operational implementations of an adaptive cache as disclosed herein.

DETAILED DESCRIPTION

Overview

Figure 1:
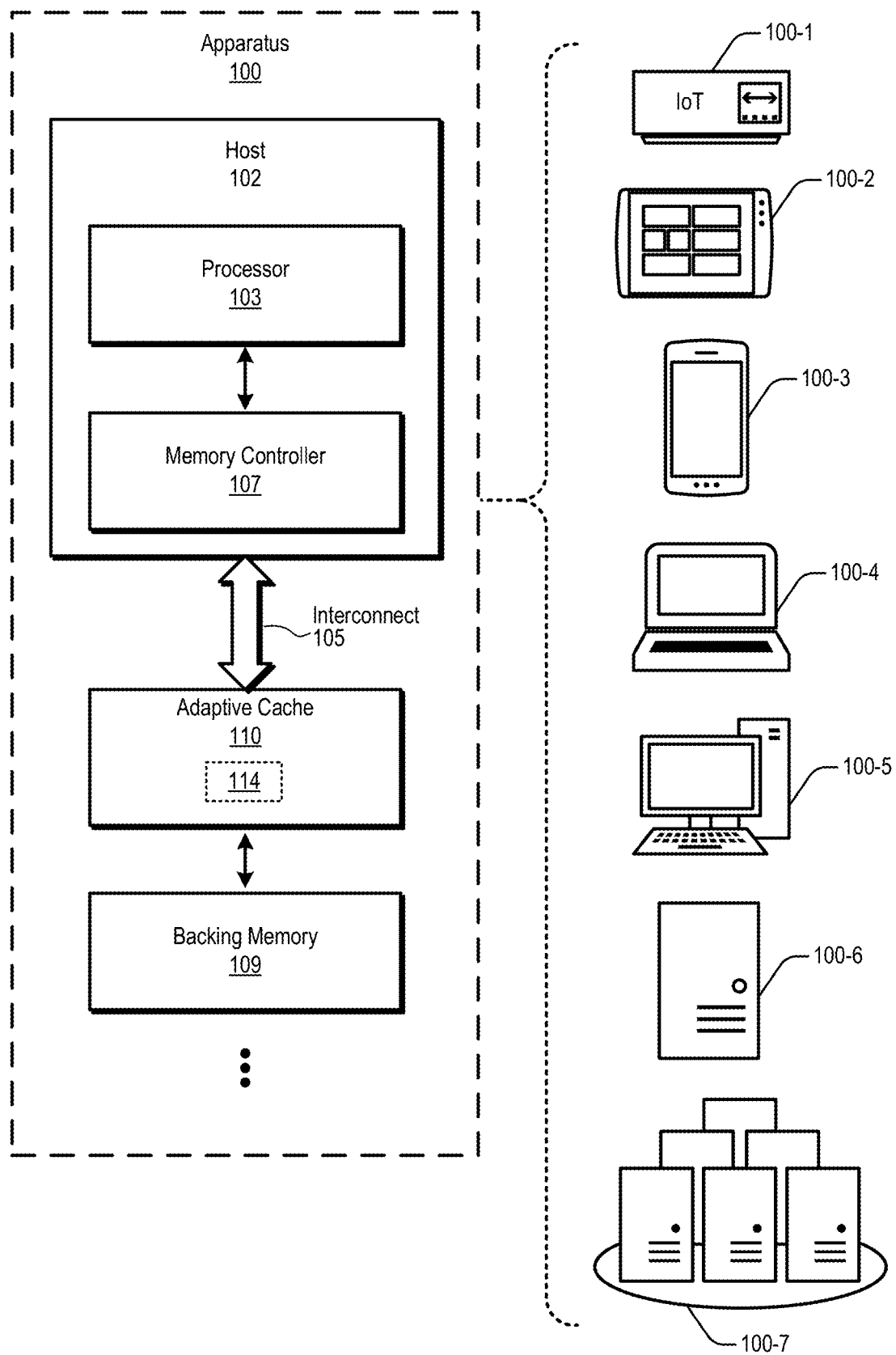
FIG. 1 illustrates an example apparatus that can implement an adaptive cache.
Figure 1:
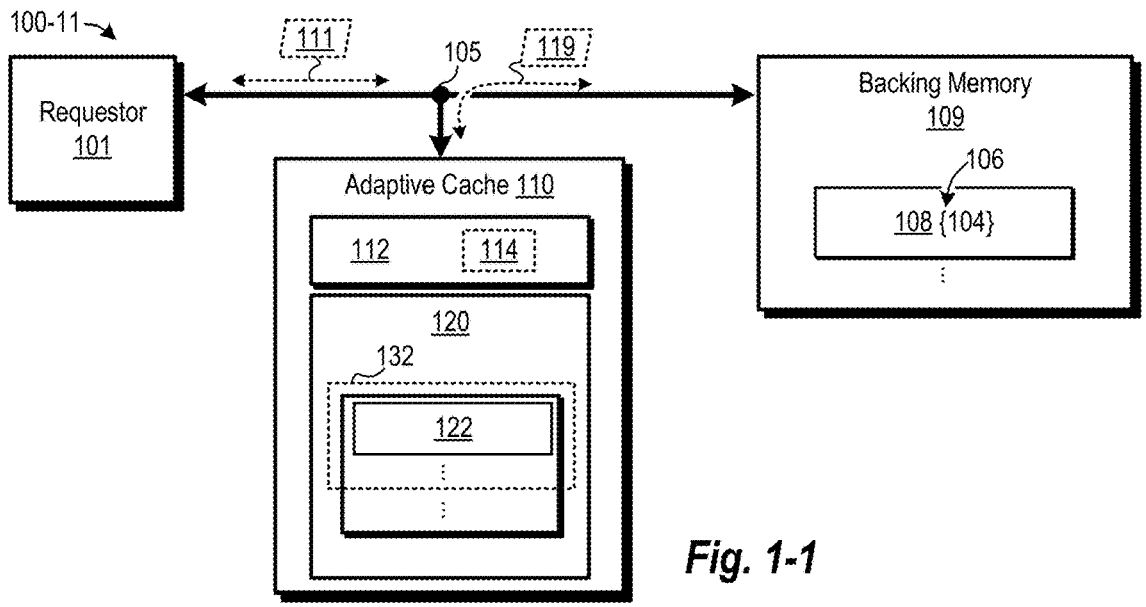

The configuration of cache hardware is typically fixed at design or fabrication time. For example, cache hardware can include a fixed number of hardware cache lines, each having a fixed-size, length, capacity, set associativity, and/or the like (e.g., a fixed cache-line size). Data is loaded into conventional caches on a cache-line basis. When a cache miss occurs, data is transferred from the backing memory into a hardware cache line. The amount of data transferred into the cache in response to the cache miss is a function of the capacity or length of the hardware cache line. A cache miss for a single address can involve transferring data of C addresses, where C is the fixed capacity of the hardware cache line. Cache misses, therefore, can involve transferring data requested because of the cache miss along with additional data that was not explicitly requested. Loading data into a cache before such data is requested is often referred to as "prefetch." The amount of prefetch that occurs due to cache-line length can be referred to as "cache-line prefetch." Since the capacity of conventional hardware-cache lines is fixed, the amount of cache-line prefetch of the hardware-cache lines, and thus that of conventional caches comprising fixed-capacity hardware cache lines, is also fixed.

The interplay between cache-line size and cache workload can significantly impact performance. The cache workload can vary between applications and/or between processing tasks. Some workloads may exhibit sequential or contiguous access patterns ("sequential workloads"), whereas other workloads may exhibit non-sequential, random, and/or pseudo-random-access patterns ("non-sequential workloads"). A "long-line" cache may perform well under sequential workloads. A cache with long, high-capacity hardware cache lines (called a "long-line" cache) can produce a high amount of cache-line prefetch since cache misses may result in fetching data sufficient to fill the high-capacity hardware cache lines. Due to the sequential access pattern, data loaded into the long, high-capacity hardware cache lines are likely to be subsequently accessed, resulting in decreased cache miss rates and therefore faster responses to memory requests from a processor.

Performance of the long-line cache may suffer, however, under other types of workloads. Under non-sequential workloads, for instance, data prefetched into the longer hardware cache lines are unlikely to be subsequently accessed before being ejected from the cache. This leads to wasted bandwidth and consumption of cache resources by low-value data that will be infrequently accessed, if ever. A cache with short, low-capacity hardware cache lines (called a "short-line" cache) may offer improved performance under non-sequential workloads. Loading data into short, low-capacity hardware cache lines can avoid wasted bandwidth and admission of low-value data under non-sequential loads. However, performance of the short-line cache may suffer under other types of workloads. Under sequential workloads, the lower degree of cache-line prefetch provided by the shorter, lower-capacity hardware cache lines can result in increased cache miss rates and ultimately slower responses to memory requests from the processor.

Since the configuration of the hardware cache lines is fixed, such caches cannot adapt to workload conditions, which can vary from application to application. For example, a long-line cache of a computing device may offer good performance when the computing device is executing an application that produces sequential workloads, such as a video editing application, but it may yield poor performance when the computing device executes other applications that produce non-sequential workloads. Conversely, a short-line cache may be capable of providing good performance while the computing device executes an application that produces non-sequential workloads, but it may yield poor performance when the computing device executes other applications that produce sequential workloads. Another approach to attempting to address these problems involves incorporating hardware cache lines with a medium capacity (called a "medium-line" cache). The medium-line cache, however, may only be capable of providing mediocre performance and, due to reliance of fixed-capacity hardware cache lines, may be incapable of producing optimal performance under different workload conditions.

This document describes a cache configured to, inter alia, adapt the configuration of the operational cache lines thereof in accordance with programmable cache-line parameters (e.g., cache-line size, length, and/or capacity). The disclosed cache may include multiple hardware cache lines, which are embodied and/or provided by hardware components. The configuration of the hardware cache lines, such as cache-line size, length, and/or capacity, may be fixed in accordance with the design and/or configuration of the cache hardware. These hardware cache lines are used to selectively establish adaptive cache lines of that offer increased flexibility to account for various workload conditions.

For example, adaptive cache lines may be formed from the hardware cache lines such that each adaptive cache line includes one or more hardware cache lines. The adaptive cache lines may be formed to have a specified cache-line size, length, and/or capacity based on a multiple of a hardware cache line. The adaptive cache lines may be configured for particular types of workloads. In one aspect, the adaptive cache lines are configured to efficiently service sequential workloads. The adaptive cache lines can be configured to have a relatively large capacity for these cases. The large capacity of the adaptive cache lines increases cache-line prefetch of the adaptive cache, resulting in lower miss rates under sequential loads and thus faster responses to memory requests from the processor. In another aspect, the adaptive cache lines can be configured to efficiently service non-sequential workloads. The adaptive cache lines can be configured to have a relatively low capacity. The low capacity of the adaptive cache lines decreases cache-line prefetch of the adaptive cache, resulting in less wasted bandwidth and admission of low-value data under the non-sequential workloads. This flexibility enables an adapted cache to be tuned to efficiently respond to memory requests that are derived from various applications with diverse workload types.

Example Operating Environments

FIG. 1 illustrates an example apparatus 100 that can implement adaptive caching, as disclosed herein. The apparatus 100 can be realized as, for example, at least one electronic device. Example electronic-device implementations include an internet-of-things (IoTs) device 100-1, a tablet device 100-2, a smartphone 100-3, a notebook computer 100-4, a desktop computer 100-5, a server computer 100-6, and a server cluster 100-7. Other apparatus examples include a wearable device, such as a smartwatch or intelligent glasses; an entertainment device, such as a set-top box or a smart television; a motherboard or server blade; a consumer appliance; vehicles; industrial equipment; and so forth. Each type of electronic device includes one or more components to provide some computing functionality or feature.

In example implementations, the apparatus 100 includes at least one host 102 and at least one processor 103. In some aspects, the apparatus 100 can further include at least one memory controller 107, at least one interconnect 105, and at least one backing memory 109. The backing memory 109 may be realized with a memory device having dynamic random-access memory (DRAM) (e.g., may comprise main memory of the host 102). Alternatively, or in addition, the backing memory 109 may be realized with a non-volatile memory device. Other examples of backing memory 109 are described herein. The apparatus 100 can further include a cache, which can be disposed between the processor 103 and the backing memory 109. In the FIG. 1 example, the cache is configured to adapt the length of the cache lines thereof in accordance with programmable cache-line parameters 114. The cache may, therefore, be referred to as an adaptive cache 110, as illustrated in FIG. 1.

As illustrated, the host 102, or host device 102, can include the processor 103 and the memory controller 107. The processor 103 can include internal cache memory (not shown in FIG. 1 to avoid obscuring details of the illustrated examples). The processor 103 can also be coupled, directly or indirectly, to the memory controller 107. The host 102 can be coupled to the backing memory 109 and/or the adaptive cache 110 through the interconnect 105. The adaptive cache 110 can be coupled to the backing memory 109 (e.g., through the interconnect 105, through another interconnect, or the like).

The depicted components of the apparatus 100 represent an example computing architecture with a hierarchical memory system. For example, internal cache memory can be logically coupled between the processor 103 and the adaptive cache 110, and the adaptive cache 110 can be coupled between the process 103 (and/or internal cache thereof) and the backing memory 109. In this example, the internal cache of the processor 103 is at a higher level of the hierarchical memory system than is the adaptive cache 110, the adaptive cache 110 is at a higher level of the hierarchical memory system than the backing memory 109, and so on. The indicated interconnect 105, as well as the other interconnects that communicatively couple together various components, enable data to be transferred between or among the various components.

Although particular implementations of the apparatus 100 are depicted in FIG. 1 and described herein, an apparatus 100 can be implemented in alternative manners. For example, the host 102 may include multiple cache memories, including multiple levels of cache memory. Any such host-level caches may be implemented as an adaptive cache 110. Further, at least one other memory device may be coupled "below" the illustrated adaptive cache 110 and/or the backing memory 109. The adaptive cache 110 and the backing memory 109 may be realized in various manners. In some cases, the adaptive cache 110 and the backing memory 109 are both disposed on, or physically supported by, a motherboard with the backing memory 109 comprising "main memory." In other examples, the adaptive cache 110 comprises DRAM, and the backing memory 109 comprises non-volatile memory, such as Flash memory, magnetic hard drive, or the like. Nonetheless, the components may be implemented in alternative ways, including in distributed or shared memory systems. Further, a given apparatus 100 may include more, fewer, or different components.

FIG. 1-1 illustrates an example environment 100-11 in which various techniques and devices described in this document can operate. As illustrated, an adaptive cache 110 can be configured to accelerate memory storage operations pertaining to a backing memory 109. The adaptive cache 110 may be configured to service requests 111 pertaining to the backing memory 109 by use of high-performance cache storage 120, which may reduce the latency of the requests 111 as compared to servicing the requests 111 by use of the backing memory 109 alone. As disclosed in further detail herein, the adaptive cache 110 includes adaptive cache lines 132 capable of being configured in accordance with one or more cache-line parameters 114. The adaptive cache lines 132 can be configured to have a specified cache-line size, length, or capacity. The cache-line parameters 114 may be programmable. The cache-line parameters 114 can be set and/or programmed in response to a command, directive, message, and/or other means. The cache-line parameters 114 can specify a capacity for the adaptive cache lines 132. The cache controller (controller 112) can be configured to form and/or manage the adaptive cache lines 132 in accordance with the programmable cache-line parameters 114. The adaptive cache lines 132 may, therefore, have a configurable capacity. The controller 112 can be further configured to cache data within the adaptive cache lines 132, which may include loading data of the backing memory 109 into respective adaptive cache lines 132, writing data from respective adaptive cache lines 132 to the backing memory 109, and so on.

The adaptive cache 110 can be configured to cache data pertaining to the backing memory 109. The backing memory 109 can be configured to store data units 104 at respective addresses 106. The backing memory 109 can include a memory storage medium having a plurality of physical memory storage locations 108, such as pages, cells, blocks, sectors, divisions, and/or the like. The backing memory 109 can include any suitable memory and/or data storage means including, but not limited to: volatile memory, main memory, primary memory, system memory, non-volatile memory, persistent memory, non-transitory memory storage, a magnetic hard disk, random access memory (RAM), read only memory (ROM), static RAM (SRAM), synchronous DRAM (SDRAM), dynamic RAM (DRAM), thyristor random access memory (TRAM), ferroelectric RAM (Fe-RAM), magnetic RAM (MRAM), resistive RAM (RRAM), solid-state memory, Flash memory, NAND Flash memory, NOR Flash memory, magnetoresistive RAM (MRAM), spin-torque transfer RAM (STT RAM), phase change memory (PCM), and/or the like. The backing memory 109 can comprise a memory storage device, such as an internal memory storage device, an external memory storage device, a peripheral memory storage device, a remote memory storage device, a Network Attached Storage (NAS) device, and/or the like.

The adaptive cache 110 can receive requests 111 pertaining to the backing memory 109 from a requestor 101. The requestor 101 can be a processor, host, client, computing device, communication device (e.g., smartphone), Personal Digital Assistant (PDA), tablet computer, Internet of Things (IoT) device, camera, memory card reader, digital display, personal computer, server computer, data management system, Database Management System (DBMS), embedded system, system-on-chip (SoC) device, or the like. The requestor 101 can include a system motherboard and/or backplane and can include processing resources (e.g., one or more processors, microprocessors, control circuitry, and/or the like).

In the example environment 100-11 illustrated in FIG. 1-1, the adaptive cache 110 can be coupled to the requestor 101 by and/or through an interconnect 105. As used herein, "coupled to" generally refers to a connection between components, which can be an indirect communicative connection (e.g., with intervening components) or direct communicative connection (e.g., without intervening components), whether wired or wireless, including connections such as electrical, optical, magnetic, etc. Examples of an interconnect, such as the interconnect 105 include, but are not limited to, a bus, signal lines, signal traces, a CPU/memory interconnect, a memory bus, a storage bus, a peripheral bus, a memory interconnect, a storage interconnect, a peripheral interconnect, a backplane, a system bus, a front-side bus, a back-side bus, an Advanced Graphics Port (AGP) bus, a peripheral bus, a peripheral component interconnect (PCI) interconnect, a PCI express (PCIe) bus, a serial advanced technology attachment (SATA) interconnect, a universal serial bus (USB), Fibre Channel, Serial Attached SCSI (SAS), a network, a network-on-chip (NoC) interconnect, a mesh network, and/or the like. The interconnect 105 can provide for passing control, address, data, and/or other signals between the requestor 101 and other components (e.g., the backing memory 109, adaptive cache 110, and/or the like). As illustrated in FIG. 1-1, the adaptive cache 110 can be coupled to the backing memory 109 by and/or through the interconnect 105. Alternatively, or in addition, the adaptive cache 110 can be coupled to the requestor 101 and/or backing memory 109 through other interconnects, interfaces, buses, and/or the like. In some aspects, the adaptive cache 110 can be interposed between the requestor 101 and the backing memory 109.

The cache storage 120 can be provided and/or be embodied by cache hardware, which can include, but is not limited to: semiconductor integrated circuitry, memory cells, memory arrays, memory banks, memory chips, and/or the like. The cache storage 120 can provide, embody and/or implement a plurality of cache lines 122. A configuration of the cache lines 122 (e.g., a size, length, and/or capacity of the cache lines 122) may be fixed in accordance with the design and/or configuration of the cache hardware and, as such, the cache lines 122 may be referred to as native, fixed, fixed-size, fixed-length, fixed-capacity, physical, or hardware cache lines 122. In some aspects, the cache storage 120 includes a memory array. The memory array may be configured as a plurality of hardware cache lines 122. The memory array may be a collection (e.g., a grid) of memory cells, with each memory cell being configured to store at least one bit of digital data. The cache storage 120 (and/or memory array) may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means. The disclosure is not limited in this regard, however, and could be adapted to incorporate any suitable type of memory, memory array, cache storage 120, and/or hardware cache lines 122.

The adaptive cache 110 can include a controller 112 configured to form adaptive cache lines 132 from the hardware cache lines 122. The adaptive cache lines 132 can be configured in accordance with programmable cache-line parameters 114. The cache-line parameters 114 can specify a size, length, and/or capacity of the adaptive cache lines 132 formed from the hardware cache lines 122. The adaptive cache lines 132 can be reconfigured in response to the cache-line parameters 114. The adaptive cache lines 132 may, therefore, be referred to as configurable cache lines, configurable hardware cache lines, adaptive hardware cache lines, virtual hardware cache lines or the like. The controller 112 may be provided, implemented, and/or realized by logic, which may include, but is not limited to: circuitry, logic circuitry, control circuitry, interface circuitry, input/output (I/O) circuitry, fuse logic, analog circuitry, digital circuitry, logic gates, registers, switches, multiplexers, arithmetic logic units (ALU), state machines, microprocessors, processor-in-memory (PIM) circuitry, and/or the like. The logic may be configured as a controller 112 of the adaptive cache 110, as disclosed herein.

The cache-line parameters 114 can be maintained in any suitable memory storage means including, but not limited to: memory storage circuitry (e.g., flip-flop circuitry, memory storage cells, and/or the like), a register, a buffer, ROM, electrically erasable programmable ROM (EEPROM), firmware, and/or the like. In some aspects, the cache-line parameters 114 are maintained within memory storage resources of the adaptive cache 110. In other aspects, the cache-line parameters 114 can be maintained in external memory storage resources (not shown in FIG. 1-1 to avoid obscuring details of the illustrated example environments). The cache-line parameters 114 can be set by the requestor 101 or other entity (e.g., can be programmed in response to a command, directive, message and/or other configuration means). Alternatively, or in addition, the cache-line parameters 114 can be set and/or adjusted by the controller 112 of the adaptive cache 110 (e.g., may be set and/or adjusted based on the workload on the adaptive cache 110).

The adaptive cache 110 can be configured to identify requests 111 pertaining to the backing memory 109 on the interconnect 105 (e.g., by monitoring, filtering, sniffing, extracting, intercepting, and/or otherwise identifying the requests 111 on the interconnect 105). The adaptive cache 110 can be further configured to service the identified requests 111 by use of the cache storage 120. Servicing the requests 111 can include performing cache transfer operations (cache transfers 119). As used herein, a cache transfer 119 refers to an operation involving the transfer of data between the backing memory 109 and the adaptive cache 110. Cache transfers 119 can include operations to transfer data to and/or from respective adaptive cache lines 132 of the cache storage 120, such as operations to load data of the backing memory 109 into respective adaptive cache lines 132 (e.g., in response to cache misses), write data from respective adaptive cache lines 132 to the backing memory 109 (e.g., in write-back, write-through, destage, and/or flush operations), and so on. The granularity of the cache transfers 119 implemented by the adaptive cache 110 (e.g., the amount of data involved in respective cache transfers 119) may, therefore, be determined by the configuration of the adaptive cache lines 132 (per the programmable cache-line parameters 114 of the adaptive cache 110).

In some aspects, the programmable cache-line parameters 114 include a target granularity for the adaptive cache lines 132; e.g., a target adaptive granularity ($G_A$). The adaptive granularity ($G_A$) can specify a size, length, and/or capacity for the adaptive cache lines 132 to be formed and/or managed by the controller 112 of the adaptive cache 110. The adaptive granularity ($G_A$) may, therefore, specify and/or determine a capacity for the adaptive cache lines 132 ($C_{ACL}$). The adaptive granularity ($G_A$) can correspond to a granularity of the cache hardware; e.g., a granularity of the hardware cache lines 122, which granularity may be referred to as a native, fixed, fixed-size, fixed-length, fixed-capacity, physical, or hardware granularity ($G_H$) of the adaptive cache 110. In some aspects, the hardware granularity ($G_H$) can be equivalent to the hardware cache-line capacity ($C_{HCL}$) of the cache storage 120 (e.g., the native, fixed, fixed-size, fixed-length, fixed-capacity, physical, or hardware capacity of the hardware cache lines 122). In other aspects, the hardware granularity ($G_H$) can be proportional to the hardware cache-line capacity ($C_{HCL}$). By way of non-limiting example, the controller 112 can be configured to implement a sectoring scheme in which respective hardware cache lines 122 are divided into a plurality of sectors (not shown in FIG. 1-1). The controller 112 can be configured to cache data of the backing memory 109 within respective sectors of the hardware cache lines 122 (e.g., transfer data to/from the cache storage 120 on a sector-by-sector basis). In these aspects, the hardware granularity ($G_H$) of the adaptive cache 110 can be expressed as $$G_H = \frac{1}{S_H} C_{HCL},$$

where $S_H$ is the number of sectors into which respective hardware cache lines 122 of the adaptive cache 110 are divided.

In some aspects, the adaptive granularity ($G_A$) of the cache-line parameters 114 can be expressed in terms of the hardware granularity ($G_H$) or hardware cache-line capacity ($C_{HCL}$). The adaptive granularity ($G_A$) can be expressed as $$G_A = V \cdot G_H \text{ or } G_A = \frac{V \cdot C_{HCL}}{S_H}$$

where V is a suitable cache-line granularity ratio. The programmable cache-line parameters 114 can specify a granularity scaling factor (V) for the adaptive cache 110, which can determine the configuration of the adaptive cache lines 132 to be formed and/or managed by the controller 112, such as by determining the granularity of adaptive cache lines 132 ($G_A$), the capacity of the adaptive cache lines 132 ($C_{ACL}$), the granularity of cache transfers 119 ($G_T$), and so on, as disclosed herein. The cache-line parameters 114 can determine a grouping and/or aggregation scheme for the adaptive cache lines 132, such as by determining the quantity of hardware cache lines 122 and/or sectors thereof to be included in respective adaptive cache lines 132. In some aspects, the quantity of hardware cache lines 122 (or sectors) included in respective adaptive cache lines 132 can be expressed as $$R = \frac{G_A}{G_H}, R = \frac{G_A \cdot S_H}{C_{HCL}}, R = \frac{V}{S_H},$$

where R is a cache-line aggregation ratio specifying the quantity of hardware cache lines 122 (or sectors thereof) to be included in respective adaptive cache lines 132 formed and/or managed by the controller 112 (and which may be specified by the cache-line parameters 114 and/or derived therefrom).

As disclosed herein, the cache-line parameters 114 can specify a configuration for the adaptive cache lines 132 by one or more of a target granularity for the adaptive cache lines 132 ($G_A$), a target capacity for the adaptive cache lines 132 ($C_{ACL}$), a cache-line aggregation ratio (aggregation ratio, R), and/or the like. The cache-line parameters 114 can be further configured to specify and/or determine the granularity and/or capacity of cache transfers 119 between the backing memory 109 and adaptive cache 110. The granularity of cache transfers 119 may be equivalent to the granularity ($G_A$) of the adaptive cache lines 132 ($C_{ACL}$), and the amount of data involved in respective cache transfers 119 ($C_T$) may be equivalent to the adaptive cache-line capacity ($C_{ACL}$) and/or a multiple thereof. The adaptive cache-line capacity ($C_{ACL}$) specified for the adaptive cache lines 132 may, therefore, determine the granularity of cache transfers 119 (e.g., may determine the minimum amount of data transferred in respective cache transfers 119). Since data are transferred into respective adaptive cache lines 132, the $C_{ACL}$ specified for the adaptive cache lines 132 can determine the amount of data (and/or extent of addresses 106) loaded into the cache in response to cache misses (e.g., the amount of data to retrieve from the backing memory 109 in respective cache transfers 119). The cache-line parameters 114 can, therefore, determine, specify, manage, and/or otherwise control cache-line prefetch of the adaptive cache 110.

In some aspects, the programmable cache-line parameters 114 can be configured in accordance with a workload on the adaptive cache 110. In one aspect, the programmable cache-line parameters 114 can be adapted to configure the adaptive cache 110 to efficiently service sequential workloads, which may include programming the cache-line parameters 114 to specify a relatively larger adaptive cache-line capacity ($C_{ACL}$), granularity ($G_A$), aggregation ratio (R), and/or the like, to cause the controller 112 to form and/or manage long, large, and/or high-capacity adaptive cache lines 132. This increases the degree of cache-line prefetch of the adaptive cache 110, which can result in improved performance under sequential workloads (e.g., decrease cache miss rate). In another aspect, the programmable cache-line parameters 114 can be adapted to configure the adaptive cache 110 to efficiently service non-sequential workloads, which may include programming the cache-line parameters 114 to specify relatively smaller adaptive cache-line capacity ($C_{ACL}$), granularity ($G_A$), aggregation ratio (R), and/or the like, to cause the controller 112 to form and/or manage short, small, and/or low-capacity adaptive cache lines 132. This decreases the degree of cache-line prefetch of the adaptive cache 110, which can result in improved performance under non-sequential workloads (e.g., prevent wasted bandwidth and admission of low-value data). As disclosed above, in some aspects, the cache-line parameters 114 can be programmed in response to a command, directive, message, and/or other configuration means (e.g., in response to information received through the interconnect 105 and/or other interface of the adaptive cache 110). Alternatively, or in addition, the cache-line parameters 114 can be set and/or adjusted by the controller 112 (e.g., in response to a workload or predicted workload on the adaptive cache 110).

Figures 1, 2:
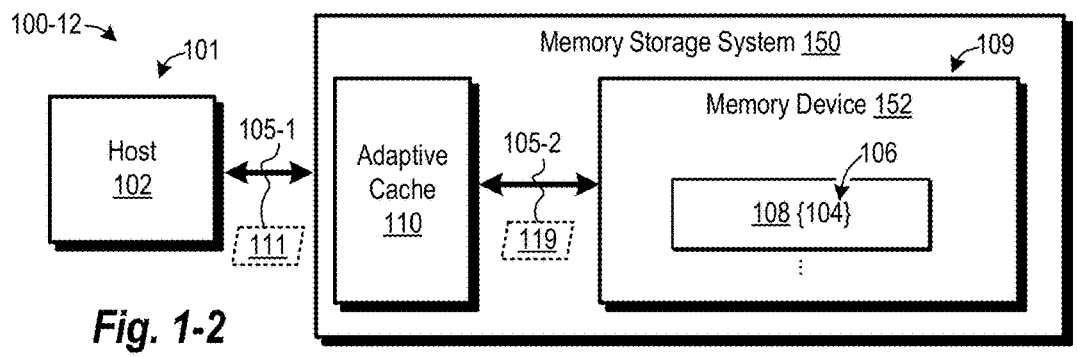

FIG. 1-2 illustrates another example environment 100-12 in which various techniques and devices described in this document can operate. As illustrated, a host 102 can include and/or be coupled to a memory storage system 150 through, inter alia, a first interconnect 105-1. The host 102 may correspond to a client or requestor 101, as disclosed herein. The memory storage system 150 can include a memory device 152 configured to store data units 104 in association with respective addresses 106 (store addressable data units 104 within physical memory storage locations 108). The memory storage system 150 can further include an adaptive cache 110 configured to cache data of the memory device 152, as disclosed herein. The memory device 152 may, therefore, be a backing memory 109 of the adaptive cache 110. The adaptive cache 110 can include a controller 112 configured to form adaptive cache lines 132 from hardware cache lines 122 of the adaptive cache 110. These aspects, which are depicted in FIG. 1-1, are not shown in FIGS. 1-2 through 1-8 to avoid obscuring details of the illustrated example environments.

The adaptive cache 110 can be coupled to the backing memory 109 (memory device 152) through a second interconnect 105-2. In some aspects, the second interconnect 105-2 can be separate and/or independent of the first interconnect 105-1 (e.g., the second interconnect 105-2 may be realized by an internal interconnect of the memory storage system 150). The adaptive cache 110 can receive requests 111 pertaining to addresses 106 of the memory storage system 150 through the first interconnect 105-1 and can perform cache transfers 119 between the backing memory 109 (memory device 152) and respective adaptive cache lines 132 through the second interconnect 105-2. The first interconnect 105-1 may, therefore, be referred to as a front-end interconnect 105-1 of the adaptive cache 110 and the second interconnect 105-2 may be referred to as a back-end interconnect 105-2 of the adaptive cache 110. As illustrated in FIG. 1-2, the adaptive cache 110 can be interposed between the requestor 101 (host 102) and the backing memory 109 (memory device 152). Alternatively, the adaptive cache 110 can be coupled to the requestor 101 (host 102) and backing memory 109 (memory device 152) through the same interconnect (e.g., through the interconnect 105 as in the example environment 100-11 of FIG. 1-1). As illustrated in the example environment 100-13 of FIG. 1-3, the memory device 152 of the memory storage system 150 can include volatile memory, such RAM 154 (e.g., DRAM). Alternatively, or in addition, the memory device 152 of the memory storage system 150 can include non-volatile (NV) memory 156, such as Flash memory, a solid-state memory device (SSD), and/or the like, as illustrated in the example environment 100-14 of FIG. 1-4.

In the example environment 100-15 of FIG. 1-5, the adaptive cache 110 is configured to service requests 111 pertaining to main memory 162 (e.g., the backing memory 109 of the adaptive cache 110 may include the main memory 162 of a computing system). The requests 111 may be generated by one or more requestors 101, such as a processor 103. The adaptive cache 110 can be coupled to the processor 103 (requestor 101) and the main memory 162 (backing memory 109) through a first interconnect 105-1, as disclosed herein. The adaptive cache 110 can be configured to cache data evicted from an internal cache of the processor 103, such as an L3 cache. In some aspects, the adaptive cache 110 is separate and/or external from the processor 103 (e.g., is embodied by separate semiconductor circuitry, chip, package, and/or the like). Alternatively, the adaptive cache 110 can be realized by an internal cache and/or cache layer of the processor 103 (e.g., the processor 103 and adaptive cache 110 can be implemented and/or embodied on the same substrate, chip, plane, package, structure and/or the like). In some aspects, and as illustrated in FIG. 1-5, the processor 103 (requestor 101), adaptive cache 110, and main memory 162 (backing memory 109) can be coupled to the same interconnect (coupled to the first interconnect 105-1). The adaptive cache 110 can be configured to intercept requests 111 directed to the backing memory 109 on the first interconnect 105-1. Intercepting the requests 111 can include identifying requests 111 pertaining to the backing memory 109; e.g., monitoring, filtering, sniffing, intercepting and/or otherwise identifying requests 111 on the first interconnect 105-1 pertaining to addresses 106 associated with the main memory 162 (e.g., addresses 106 within an address and/or namespace of the main memory 162). The intercepting can further include ignoring traffic pertaining to other components coupled to the first interconnect 105-1 (e.g., ignoring requests pertaining to addresses 106 outside of the address and/or namespace of the main memory 162). As disclosed above, the adaptive cache 110 can be further configured to service the requests 111, which can include, but is not limited to: populating respective adaptive cache lines 132 from the backing memory 109 (main memory 162) in response to cache misses (e.g., performing cache transfers 119 to load data into respective adaptive cache lines 132), accessing data cached within the adaptive cache lines 132 in response to cache hits, writing respective adaptive lines 132 to the backing memory 109 (main memory 162), and so on. Servicing the requests 111 can, therefore, include performing cache transfers 119 at a granularity corresponding to a granularity ($G_A$) and/or capacity ($C_{ACL}$) of the adaptive cache lines 132 formed and/or managed by the controller 112 per the programmable cache-line parameters of the adaptive cache 110.

As illustrated in FIG. 1-5, the adaptive cache 110, requestor 101 (processor 103), and backing memory 109 (main memory 162) can be coupled to a common physical interconnect (e.g., the first interconnect 105-1). In other aspects, and as illustrated in example 100-16 of FIG. 1-6, the adaptive cache 110 can be interposed between the requestor 101 (processor 103) and the backing memory 109 (main memory 162). The adaptive cache 110 can be coupled to the requestor 101 (processor 103) through the first or front-end interconnect 105-1 and can be coupled to the backing memory 109 (main memory 162) through the second or back-end interconnect 105-2. The adaptive cache 110 can receive requests 111 pertaining to the backing memory 109 (main memory 162) through the front-end interconnect 105-1 and can perform cache transfers 119 through the back-end interconnect 105-2.

In some aspects, the adaptive cache 110 can include, be coupled to, and/or be disposed between one or more layers of a memory and/or cache hierarchy. As illustrated in example environment 100-17 of FIG. 1-7, the adaptive cache 110 can be coupled between cache layer LX (LX cache 171) and main memory 162. The adaptive cache 110 can be coupled to the LX cache 171 through a front-end interconnect 105-1 and can be coupled to the main memory 162 through a back-end interconnect 105-2. The LX cache 171 can be a requestor 101 and the main memory 162 can be the backing memory 109 of the adaptive cache 110. In one aspect, the LX cache 171 is an internal cache layer of the processor 103 (e.g., an L3 cache of the processor 103). In another aspect, the LX cache 171 can be an external cache layer (e.g., can be implemented and/or embodied by a separate integrated circuit or chip). In yet another aspect, the LX cache 171 and the adaptive cache 110 can be internal cache layers of the processor 103.

As illustrated by the example environment 100-18 of FIG. 1-8, the adaptive cache 110 can be deployed between cache layers. The adaptive cache 110 can be coupled to cache layer X (LX cache 171) through a front-end interconnect 105-1 and can be coupled to cache layer Y (LY cache 173) through a back-end interconnect 105-2, which may be coupled to main memory 162 and/or other memory storage means. In FIG. 1-8, the LX cache 171 is a client or requestor 101 and the LY cache 173 is the backing memory 109 of the adaptive cache 110. Thus, the adaptive cache 110 can be configured to cache data evicted from the LX cache 171, and the LY cache 173 can be configured to cache data evicted from the adaptive cache 110.

Example Schemes, Techniques, and Hardware for an Adaptive Cache

FIG. 2 illustrates example operational implementations of the adaptive cache 110 illustrated in one or more of FIGS. 1-1 through 1-8. The controller 112 of the adaptive cache 110 can be coupled to a front-end interconnect 105-1 and/or a back-end interconnect 105-2. The controller 112 can receive requests 111 pertaining to data of a backing memory 109 from a requestor 101, such as a client, computing device, computing system, host 102, processor 103, cache layer (e.g., LX cache 171), and/or the like. The requests 111 can be received through the front-end interconnect 105-1. The controller 112 can be coupled to the backing memory 109 through the back-end interconnect 105-2. The backing memory 109 can include any suitable memory storage means including, but not limited to: a memory device, a memory medium, a memory storage system 150, a memory device 152, RAM 154, NV memory 156, main memory 162, a cache layer (e.g., LY cache layer 173), a memory storage device, an internal memory storage device, an external memory storage device, a remote memory storage device, a NAS device, and/or the like. In some aspects, the front-end interconnect 105-1 and the back-end interconnect 105-2 include and/or correspond to a same interconnect (e.g., the controller 112 can be coupled to the requestor 101 and backing memory 109 through the same interconnect). In other aspects, and as illustrated in FIG. 2, the controller 112 can be coupled to the requestor 101 and the backing memory 109 through separate interconnects (by the front-end interconnect 105-a and back-end interconnect 105-2, respectively).

The controller 112 can be configured to form and/or manage adaptive cache lines 132, as disclosed herein. The adaptive cache lines 132 can be formed from native, fixed, fixed-size, fixed-length, fixed-capacity, physical, or hardware cache lines 122, which may be provided, implemented, and/or embodied in cache hardware, as disclosed herein. In the FIG. 2 example, the cache storage 120 includes X fixed-capacity hardware cache lines 122 (hardware cache lines 122A-X). The hardware cache lines 122 can include and/or be associated with respective hardware cache-line (HCL) tags 124 (HCL tags 124A-X), which can be configured to, inter alia, identify data cached within the respective hardware cache lines 122. The HCL tags 124 can include portions of addresses 106 associated with data cached within the respective hardware cache lines 122 (e.g., may hold tag bits and/or a tag region 224 of the addresses 106). The hardware cache lines 122 can further include and/or be coupled to hardware cache-line (HCL) metadata 123 (HCL metadata 123A-X), which can include metadata pertaining to data cached therein including, but not limited to: validity flags (to indicate whether the hardware cache lines 122 hold valid data), dirty flags (to indicate whether data stored within the hardware cache lines 122 are dirty), and so on. The hardware cache lines 122 can have a fixed configuration, such as a fixed granularity ($G_H$), capacity ($C_{HCL}$), set associativity, and so on (per the design and/or configuration of the cache hardware), as disclosed herein. In the FIG. 2 example, the hardware cache lines 122 are non-sectored, such that $G_H = C_{HCL}$ ($S_H = 1$).

The controller 112 of the adaptive cache 110 can include and/or be coupled to a cache-line manager 212. The cache-line manager 212 can be coupled to the cache storage 120 (e.g., can be coupled to the hardware cache lines 122). The cache-line manager 212 can be configured to form adaptive cache lines 132 from the hardware cache lines 122, cache data within respective adaptive cache lines 132, and so on. The adaptive cache lines 132 can include and/or be associated with adaptive cache-line (ACL) tags 134. The ACL tags 134 may be formed from HCL tags 124 of corresponding hardware cache lines 122. The adaptive cache lines 132 may further include adaptive cache-line (ACL) capacity 232 ($C_{ACL}$), which may correspond to data storage capacity of the corresponding hardware cache lines 122. The configuration of the adaptive cache lines 132, such as the ACL capacity 232 ($C_{ACL}$) of the adaptive cache lines 132, can be determined by the cache-line parameters 114, as disclosed herein (e.g., based on a specified aggregation ratio (R) or the like). In the non-sectored example of FIG. 2, the cache-line manager 212 can be configured to form L adaptive cache lines 132, where L=X/R. Each adaptive cache line 132 can include a respective group of R hardware cache lines 122. The ACL tags 134 can include and/or correspond to HCL tags 124 of one or more of the R hardware cache lines 122, and the ACL capacity 232 ($C_{ACL}$) can include and/or correspond to the combined hardware cache-line capacity ($C_{HCL}$) of the R hardware cache lines 122. Further, the ACL metadata 133 can include and/or correspond to HCL metadata 123 of one or more of the R hardware cache lines 122.

Forming the adaptive cache lines 132 can include combining hardware cache lines 122 in accordance with cache-line parameters 114. The adaptive cache lines 132 can be configured to have a specified ACL capacity 232 ($C_{ACL}$) where $C_{ACL} > C_{HCL}$. The adaptive cache lines 132 may be formed by combining groups of hardware cache lines 122, each group comprising R hardware cache lines 122. Combining hardware cache lines 122 into adaptive cache lines 132 can further include designating an HCL tag 124 of one of the hardware cache lines 122 as the ACL tag 134 of the adaptive cache lines 132, which can include disabling, deactivating, and/or otherwise ignoring HCL tags 124 of other hardware cache lines 122 in the group. Alternatively, or in addition, the HCL tags 124 can be linked (e.g., set to a same tag value). The combining can further include using HCL metadata 123 of one of the hardware cache lines 122 as ACL metadata 133 for the adaptive cache line 132, which can include disabling, deactivating, and/or otherwise ignoring ACL metadata 133 of the other hardware cache lines 122. Combining hardware cache lines 122 can include forming ACL capacity 232 from a plurality of hardware cache lines 122 (e.g., combining data storage capacity of the plurality of hardware cache lines 122). Combining hardware cache lines 122 can include aggregating, linking, and/or otherwise grouping the hardware cache lines 122 into an adaptive cache line 132 (e.g., combining, aggregating, linking, and/or otherwise forming ACL capacity 232 from $C_{HCL}$ of the hardware cache lines 122). Combining hardware cache lines 122 can include associating the plurality of hardware cache lines 122 with a same ACL tag 134 (e.g., a selected one of a plurality of HCL tags 124), operably coupling the hardware cache lines 122 through interconnect, interface, routing, and/or other circuitry coupling the controller 112 to the cache storage 120, and so on.

In some aspects, the controller 112 (or cache-line manager 212) includes and/or is coupled to cache interface logic (a cache interface 214), which can be configured to form adaptive cache lines 132 from hardware cache lines 122, as disclosed herein. The cache interface 214 can be further configured to form respective adaptive cache lines 132 from hardware cache lines 122 capable of being accessed independently and/or in parallel. The cache interface 214 can be configured to combine hardware cache lines 122 embodied in different and/or independent portions of the cache storage 120, which can include combining hardware cache lines 122 within different and/or independent chips, planes, banks, sets, arrays, rows, columns, and/or the like. In some aspects, the hardware cache lines 122 can be banked across rows (e.g., arranged into rows or sets, each corresponding to a respective bank). When the cache-line parameters 114 specify an adaptive cache-line size ($C_{ACL}$) less than or equal to the hardware cache-line size ($C_{HCL}$), the cache interface 214 can interleave adaptive cache lines 132 across respective rows or sets of hardware cache lines 122. When the cache-line parameters 114 specify an adaptive cache-line size ($C_{ACL}$) larger than the hardware cache-line size ($C_{HCL}$), the cache interface 214 can combine hardware cache lines 122 from a plurality of different groups (rows or sets). The cache interface 214 can be configured to access an ACL capacity 232 corresponding to the hardware cache lines 122 at least partially in parallel. The cache-line parameters 114 can specify an aggregation ratio (R) that is a power-of-two multiple (specify $C_{ACH}$ as a power of 2 multiple of $C_{HCL}$), and the cache interface 214 can form adaptive cache lines 132 from hardware cache lines 122 within respective R rows or sets, which can enable the cache interface 214 to access the ACL capacity 232 of the adaptive cache lines 132 at least partially in parallel (across R rows or sets of hardware cache lines 122). In some aspects, the cache interface 214 is configured to provide access to the ACL capacity 232 of adaptive cache lines 132 at least partially in parallel. The cache interface 214 can be configured to access a plurality of hardware cache lines 122 of an adaptive cache line 132 at least partially in parallel. Alternatively, the cache interface 214 can access ACL capacity 232 of adaptive cache lines 132 sequentially (e.g., can access hardware cache lines 122 comprising respective adaptive cache lines 132 sequentially). The cache interface 214 may be provided, implemented, and/or realized by logic, which may include, but is not limited to: circuitry, logic circuitry, interface circuitry, interface control circuitry, I/O circuitry, fuse logic, analog circuitry, digital circuitry, logic gates, registers, switches, multiplexers, ALUs, state machines, microprocessors, PIM circuitry, and/or the like. The logic may be configured as a cache interface 214 of the adaptive cache 110, as disclosed herein.

The cache-line manager 212 can be further configured to determine whether specified addresses 106 have been loaded into adaptive cache lines 132 of the cache storage 120, which can include identifying adaptive cache lines 132 associated with the specified addresses 106 (if any). Determining whether an adaptive cache line 132 holds data corresponding to a specified address 106 can include comparing the ACL tag 134 of the adaptive cache line 132 to a tag region 224 of the specified address 106 (and/or evaluating ACL metadata 133 of the adaptive cache line 132, such as validity flags and/or the like).

Example 200-1 of FIG. 2 illustrates an operational implementation of the adaptive cache 110 having non-sectored hardware cache lines 122 (where $S_H=1$ and $G_H=C_{HCL}$) under cache-line parameters 114 that specify an aggregation ratio (R) of 1. As illustrated, the cache-line manager 212 can include and/or be coupled to interface logic (a cache interface 214) configured to form adaptive cache lines 132 by, inter alia, aggregating, combining, and/or grouping respective hardware cache lines 122, as disclosed herein. In response to the aggregation ratio (R) of 1 specified by the cache-line parameters 114, the cache interface 214 is configured to form L adaptive cache lines 132, with each adaptive cache line 132 formed from a respective one of the X hardware cache lines 122, such that L=X (where $S_H=1$ and $G_H=C_{HCL}$) and the ACL capacity 232 ($C_{ACL}$) of respective adaptive cache lines 132 corresponds to the capacity of respective hardware cache lines 122 ($C_{HCL}$).

The cache-line manager 212 can further include and/or be coupled to compare logic 216, which can be configured to compare addresses 106 to respective adaptive cache lines 132. The compare logic 216 can be configured to determine whether a selected adaptive cache line 132 holds data corresponding to a specified address 106, by comparing the ACL tag 134 of the adaptive cache line 132 to the tag region 224 of the specified address 106. In example 200-1 (where R=1), the ACL tags 134 can be formed from HCL tags 124 of respective hardware cache lines 122. The compare logic 216 can be further configured to evaluate ACL metadata 133 of the adaptive cache lines 132 (e.g., evaluate a valid flag, dirty flag, and/or the like). In example 200-1 (where R=1), the ACL metadata 133 can be formed from HCL metadata 123 of respective hardware cache lines 122.

Example 200-2 of FIG. 2 illustrates an operational implementation of the adaptive cache 110 having non-sectored hardware cache lines 122 (where $S_H=1$ and $G_H$=CH0 under cache-line parameters 114 that specify an aggregation ratio (R) of 2. In example 200-2, the cache interface 214 is configured to form L adaptive cache lines 132 from the X hardware cache lines 122, where $$L = \frac{X}{2}$$

and the adaptive cache storage 232 ($C_{ACL}$) of respective adaptive cache lines 132 is $2 \cdot C_{HCL}$. The ACL tags 134 of respective adaptive cache lines 132 can be realized by the HCL tag 124 of one of the corresponding hardware cache lines 122 (one of the HCL tags 124 of the two hardware cache lines 122 comprising the adaptive cache line 132). Accordingly, comparing an adaptive cache line 132 to a specified address 106 can involve a single tag comparison as opposed to the two tag comparisons that would be required to compare the specified address 106 to each of the two hardware cache lines 122 comprising the adaptive cache line 132. The use of adaptive cache lines 132 may, therefore, reduce the latency and/or power consumption of cache-line addressing, in addition to improved performance under sequential loads due to, inter alia, an increased cache hit rate resulting from an increased cache-line prefetch.

Example 200-3 of FIG. 2 illustrates further operational implementations of the adaptive cache 110 having non-sectored hardware cache lines 122 (where $S_H=1$ and $G_H=C_{HCL}$). In example 200-3, the cache-line parameters 114 specify an aggregation ratio (R) larger than two $$\left(\text{e.g., } 2 < R < \frac{X}{2}\right).$$

In example 200-3, the cache interface 214 is configured to form L adaptive cache lines 132 from the X hardware cache lines 122, where $$L = \frac{X}{R}.$$

Here, each adaptive cache line 132 has an adaptive cache storage 232 ($C_{ACL}$) of $R \cdot C_{HCL}$, an ACL tag 134 corresponds to the HCL tag 124 of one of the R hardware cache lines 122, and ACL metadata 133 corresponds to HCL metadata 123 of one of the R cache lines 122. Accordingly, comparing an adaptive cache line 132 to a specified address 106 can involve a single tag comparison as opposed to the R tag comparisons required to compare the specified address 106 to each of the R hardware cache lines 122 comprising the adaptive cache line 132. The use of adaptive cache lines 132 in example 200-3 may, therefore, further reduce the latency and/or power consumption of cache-line addressing, in addition to further improving performance under sequential loads due to, inter alia, an increased cache hit rate resulting from further increases to cache-line prefetch.

As illustrated in FIG. 2, addresses 106 of data stored within the adaptive cache 110 may be divided into a tag region 224, set region 226, and offset region 228. The set region 226 may be used to map addresses 106 to respective cache-line sets (not shown in FIG. 2 to avoid obscuring details of the illustrated examples). The quantity of bits included in the set region 226 can correspond to a scheme by which addresses 106 are mapped to respective sets; e.g., $S_I = S_B \bmod C_S$, where $S_B$ is the set region 226 of the address 106, and $C_S$ is the quantity of cache-line sets with $S_I$ being the index of the cache-line set for the address 106. The disclosure is not limited in this regard, however, and could use any suitable set association technique (e.g., hash or the like). The offset region 228 can correspond to a data granularity of the adaptive cache 110. More specifically, the offset region 228 can correspond to a number of addressable data units 104 (or number of addresses 106) capable of being cached within respective adaptive cache lines 132. This can be represented by, for example, $$O_B = \log_2 \frac{C_{ACL}}{A_G},$$

where $O_B$ is the number of bits included in the offset region 228, and $A_G$ is the address granularity of the data units 104 to be stored within the adaptive cache lines 132 (e.g., the size, length, and/or amount of the data units 104 associated with respective addresses 106).

The cache-line manager 212 can be configured to adapt region(s) of the addresses 106 in accordance with the cache-line parameters 114 of the adaptive cache 110 (e.g., per the ACL capacity 232 ($C_{ACL}$) of the adaptive cache lines 132). Table 1 illustrates address bit counts adapted for respective cache-line parameters 114; e.g., respective aggregation ratios (R). The addresses 106 may include 25 bits. For simplicity, in the Table 1 example, the address granularity ($A_G$) is assumed to be 32B, and each hardware cache line 122 is capable of caching two 32-byte data units 104 ($G_H=C_{HCL}$=64B):

TABLE 1

| $S_H = 1, A_G = 32B, C_{HCL} = 64B$, 25-bit addresses | | | | | |
|---|---|---|---|---|---|
| 114 {R} | 1 | 2 | 4 | 8 | 16 |
| $C_{ACL}$ | 64B | 128B | 256B | 512B | 1024B |
| 228 ($O_B$) | 1 | 2 | 3 | 4 | 5 |
| 226 ($S_B$) | 12 | 11 | 10 | 9 | 8 |
| 224 (tag) | 12 | 12 | 12 | 12 | 12 |

Figures 1, 2, 3:
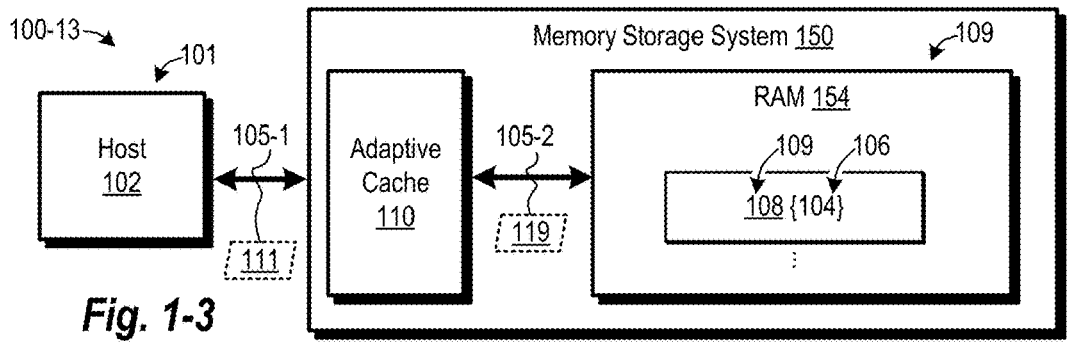

FIG. 3 illustrates further example operational implementations of an adaptive cache 110, as disclosed herein. The controller 112 of the adaptive cache 110 can be configured to receive requests 111 pertaining to a backing memory 109 and service the requests by use of cache storage 120. In some aspects, the controller 112 can receive the requests 111 and perform the cache transfers 119 over a same interconnect. In the FIG. 3 example, however, the cache controller 112 includes a front-end interface 313 configured to couple the adaptive cache 110 to a first or front-end interconnect 105-1 and a back-end interface 315 configured to couple the adaptive cache 110 to a second or back-end interconnect 105-2. The controller 112 can receive and/or intercept requests 111 pertaining to the backing memory 109 on the front-end interconnect 105-1. The requests 111 may reference data of the backing memory 109 by use of addresses 106 of an address and/or namespace. The back-end interface 315 can be configured to perform cache transfers 119 between the adaptive cache 110 and the backing memory 109, as disclosed herein.

The cache storage 120 can include a plurality of hardware cache lines 122. The hardware cache lines 122 can include and/or be associated with respective HCL tags 124, HCL metadata 123, and so on (not shown in FIG. 3). In some aspects, the HCL tags 124 can be implemented on a physically separate structure from the hardware cache lines 122 (e.g., on a different memory array). The tag and data arrays can be banked across rows. In the FIG. 3 example, the hardware cache lines 122 are arranged into a plurality of sets 322 (e.g., into M sets 322A-322M). As illustrated, the sets 322 can include respective groups of N hardware cache lines 122; the sets 322 can be N-way associative, each comprising N ways or N hardware cache lines 122 (where M·N=X, the number of hardware cache lines 122 comprising the cache storage 120). The hardware cache lines 122 can correspond to respective set indexes ($I_S$); the N hardware cache lines 122 of each set 322 can correspond to respective set indexes ($I_S$) A through N (or 0 through N−1).

As illustrated, set 322A includes hardware cache lines 122A-A through 122A-N, set 322B includes hardware cache lines 122B-A through 122B-N, and so on, with set 322M comprising hardware cache lines 122M-A through 122M-N. The sets 322 can be implemented and/or be embodied within respective banks or rows (the hardware cache lines 122 can be banked across respective sets 322). The cache interface 214 can be configured to access multiple sets 322 at least partially in parallel. In some aspects, the cache interface 214 can access hardware cache lines 122 within two or more different sets 322 in parallel. The cache interface 214 can be further configured to access corresponding HCL tags 124 at least partially in parallel (e.g., in implementations where the HCL tags are embodied within a separate memory structure). The configuration of the sets 322 may be determined by the design and/or configuration of the cache hardware and, as such, may be referred to as native, fixed, fixed-size, fixed-length, fixed-capacity, physical, or hardware sets 322.

The cache-line parameters 114 can be programmed to specify a target capacity ($C_{ACL}$) for the adaptive cache lines 132. The cache interface 214 can access the cache-line parameters 114 and form adaptive cache lines 132 having the capacity ($C_{ACL}$) specified thereby. The cache interface 214 can be further configured to arrange adaptive cache lines 132 into adaptive sets 332; forming the adaptive cache lines 132 can further include forming adaptive sets 332, each comprising a respective group of adaptive cache lines 132. The number and/or configuration of adaptive cache lines 132 and/or adaptive sets 332 can be a function of the cache-line parameters 114. In response to cache-line parameters 114 specifying an $C_{ACL}$ less than or equal to the hardware cache-line capacity ($C_{HCL}$), the cache interface 214 can form adaptive cache lines 132 by, inter alia, interleaving set indexes ($I_S$) across respective hardware sets 322 (across respective rows or banks). In the FIG. 3 example, the cache-line parameters 114 specify an $C_{ACL}$ equivalent to $C_{HCL}$ (R=1), and the adaptive cache lines 132 are formed from respective ones of the hardware cache lines 122 (the cache interface 214 interleaves set indexes ($I_S$) of the adaptive cache lines 132 across respective hardware sets 322), and the adaptive sets 332 correspond to respective hardware sets 322.

The cache-line manager can be configured to map addresses 106 to adaptive cache lines 132. The cache interface 214 can use contents of the set region 226 of the address 106 to select an adaptive set 332 in every way, and the compare logic 216 can compare contents of the tag region 224 of the address 106 to ACL tags 134 of respective adaptive cache line 132 of the selected adaptive set 332. A match indicates a cache hit and no match indicates a cache miss. In response to a cache hit, the ACL capacity 232 of the matching adaptive cache line 132 can be read or written (per the request 111 associated with the address 106). In response to a cache miss, a victim adaptive cache line 132 can be selected for replacement (and writeback if dirty). The victim adaptive cache line 132 can be selected in accordance with a suitable replacement policy, such as First In First Out (FIFO), Last In First Out (LIFO), Least Recently Used (LRU), Time Aware LRU (TLRU), Most Recently Used (MRU), Least-Frequently Used (LFU), random replacement, and/or the like. The selected adaptive cache line 132 can be populated with data retrieved from the backing memory 109 in a cache transfer 119 performed through the back-end interface 315. The cache transfer 119 can be configured to transfer an amount of data sufficient to fill an adaptive cache line 132 ($C_{ACL}$) as specified by the cache-line parameters 114.

The cache interface 214 can reconfigure the adaptive cache lines 132 (and/or adaptive sets 332) in response to the cache-line parameters 114. The cache interface 214 can form adaptive cache lines 132 by combining groups of hardware cache lines 122 in response to cache-line parameters 114 specifying an adaptive cache-line capacity ($C_{ACL}$) greater than the hardware cache line capacity ($C_{HCL}$); e.g., where R>1. In some aspects, the cache interface 214 is configured to adjust the $C_{ACL}$ of the adaptive cache lines 132 to a power-of-two multiple of $C_{HCL}$ (e.g., where R is one of 1, 2, 4, 8, 16, 32, 64, and so on). The cache interface 214 can group, combine, and/or aggregate hardware cache lines 122 in accordance with a selected scheme, such as an intra-set scheme, an inter-set scheme, or the like. Example intra-set schemes are described next with reference to FIG. 4, and example inter-set schemes are described further below with reference to FIGS. 5-1 and 5-2.

Figures 1, 2, 3, 4:
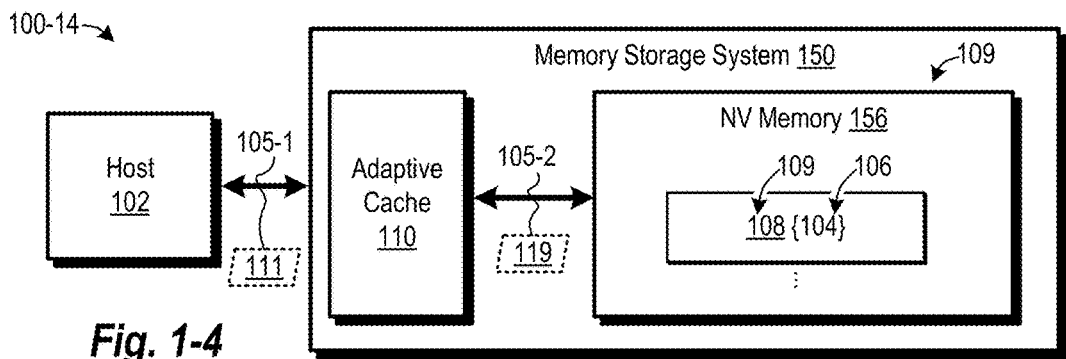

Forming adaptive cache lines 132 according to an intra-set scheme can include combining hardware cache lines 122 within respective hardware sets 322 (e.g., by combining ways within respective hardware sets 322 and disabling unused HCL tags 124). In this implementation, the cache interface 214 forms M adaptive sets 332 from M hardware sets 322, each adaptive set 332 comprising $$\frac{N}{R}$$

ways (e.g., $$\frac{N}{R}$$

adaptive cache lines 132). The intra-set scheme may, therefore, result in reduced set associativity. FIG. 4 illustrates examples of adaptive cache lines 132 formed in accordance with an intra-set scheme within cache storage 120 comprising cache data hardware 321 and cache tag hardware 323. The cache data hardware 321 can realize, provide, and/or embody data storage capacity of respective hardware cache lines 122 (and/or corresponding HCL metadata 123, not shown in FIG. 4 to avoid obscuring details of the illustrated examples). The tag hardware 323 can realize, provide, and/or embody HCL tags 124 of the hardware cache lines 122.

As illustrated, the cache data hardware 321 and cache tag hardware 323 can be implemented as physically separate structures (e.g., separate memory circuitry, arrays, planes, chips, banks, and/or the like). The cache data hardware 321 and/or cache tag hardware 323 can be banked across rows (or sets). The cache data hardware 321 can include a plurality of N-way hardware sets 322 (e.g., hardware sets 322A-M, each comprising N hardware cache lines 122) and the tag hardware 323 can include corresponding tag sets 324 (e.g., tag sets 324A-M, each comprising N HCL tags 124). In some aspects, the hardware sets 322A-M and/or tag sets 324A-M are implemented on respective banks. The cache interface 214 can be configured to access the hardware sets 322A-M at least partially in parallel (and/or concurrently); e.g., the cache interface 214 can be configured to access a hardware cache line 122 in each of two or more different hardware sets 322 concurrently. The cache interface 214 can be further configured to access the tag sets 324A-M at least partially in parallel (and/or concurrently); e.g., the cache interface 214 can be configured to access a HCL tag 124 in each of two or more different tag sets 324 concurrently.

In example 400-1, the cache interface 214 is configured to form adaptive cache lines 132 per cache-line parameters 114 specifying an $C_{ACL}=C_{HCL}$ (R=1) in accordance with an intra-set scheme. As illustrated, the cache interface 214 forms adaptive cache lines 132 from respective hardware cache lines 122, each adaptive cache line 132 comprising a respective one of the hardware cache lines 122, and each ACL tag 134 comprising a respective one of the HCL tags 124.

In example 400-2, the cache interface 214 is configured to form adaptive cache lines 132 per cache-line parameters 114 specifying an $C_{ACL}=2 \cdot C_{HCL}$ (R=2) in accordance with an intra-set scheme. As illustrated, the cache interface 214 forms adaptive cache lines 132 by combining hardware cache lines 122 within respective hardware sets 322 (and combining HCL tags 124 within respective tag sets 324). In the intra-set scheme, the cache interface 214 forms the same number of adaptive sets 332 as hardware sets 322 (e.g., forms M adaptive sets 332A-M), but modifies the associativity of the adaptive sets 332 to be F-way associative rather than N-way associative, where $$F = \frac{N \cdot C_{HCL}}{C_{ACL}}, F = \frac{N}{R}, \text{ or } F = \frac{N}{2}$$

where R=2. As illustrated in 400-2, the adaptive cache lines 132 can be formed from respective groups of two hardware cache lines 122; adaptive cache line 132A-A can include hardware cache lines 122A-A and 122A-B of hardware set 322A, and so on, with adaptive cache line 132M-F comprising hardware cache lines 122M-M and 122M-N of hardware set 322M. Forming the adaptive cache lines 132 can include operably combining a plurality of hardware cache lines 122 (and/or HCL tags 124), as disclosed herein. Forming the adaptive cache lines 132 can further include forming ACL tags 134 by, inter alia, combining respective groups of two HCL tags 124 within respective tag sets 324 (per the intra-set scheme). As illustrated, the ACL tag 134A-A of adaptive cache line 132A-A can be formed from the group comprising HCL tags 124A-A and 124A-B of tag set 324A, and so on, with the ACL tag 134M-F of adaptive cache line 132M-F formed from the group comprising HCL tags 124M-M and 124M-N of tag set 324M. Combining a group of HCL tags 124 into an ACL tag 134 may include designating one of the HCL tags 124 as the ACL tag 134 and disabling, deactivating, or otherwise ignoring the other HCL tags 124 of the group.

In example 400-3, the cache interface 214 is configured to form adaptive cache lines 132 per cache-line parameters 114 specifying an $C_{ACL}=4*C_{HCL}$ (R=4) in accordance with an intra-set scheme. As illustrated, the adaptive cache lines 132 can be formed from respective groups of four hardware cache lines 122; adaptive cache line 132A-A can include hardware cache lines 122A-A through 122A-D of hardware set 322A, and so on, with adaptive cache line 132M-F comprising hardware cache lines 122M-K through 122M-N of hardware set 322M. Forming the adaptive cache lines 132 can further include forming ACL tags 134 by, inter alia, combining respective groups of four HCL tags 124 within respective tag sets 324 (per the intra-set scheme). As illustrated, the ACL tag 134A-A of adaptive cache line 132A-A can be formed from the group comprising HCL tags 124A-A through 124A-D of tag set 324A, and so on, with the ACL tag 134M-F of adaptive cache line 132M-F formed from the group comprising HCL tags 124M-K through 124M-N of tag set 324M. The set associativity of the resulting adaptive sets 332 may, therefore, be reduced by a factor of four (F-way associative where $$F = \frac{N}{4}).$$

Although particular examples, of techniques for forming adaptive cache lines 132, ACL tags 134, and/or adaptive sets 332 in accordance with an intra-set scheme are described (e.g., where R=1, 2, and 4), the disclosure is not limited in this regard and could be adapted to support any suitable cache-line aggregation factor R (and/or ratio of $$\frac{C_{ACL}}{C_{HCL}})$$

in accordance with an intra-set or other hardware cache line aggregation scheme.

Forming adaptive cache lines 132 according to an inter-set scheme can include forming adaptive cache lines 132 by, inter alia, combining hardware cache lines 122 across multiple hardware sets 322 at same (or deterministic) ways or set indexes ($I_S$). In this implementation, the cache interface 214 forms H adaptive sets 332 from M hardware sets 322, the adaptive sets 332 having a same associativity as the M hardware sets 322 (N-way associativity), where $$H = \frac{M}{R} \text{ or } H = \frac{M \cdot C_{HCL}}{C_{ACL}}.$$

Figures 1, 2, 3, 4, 5:
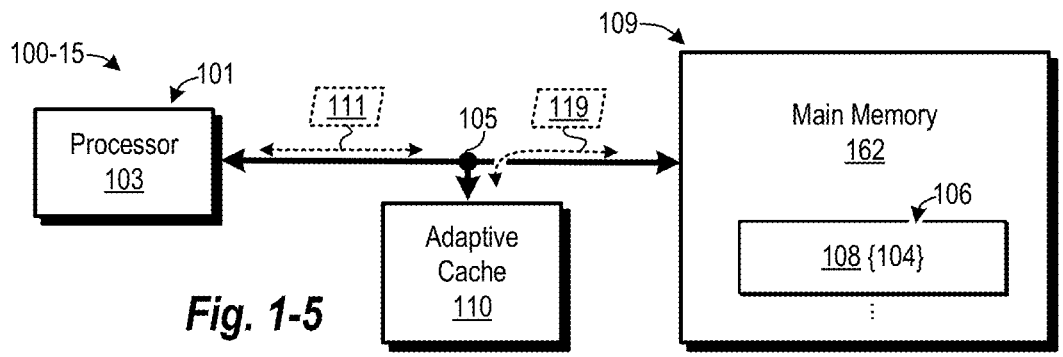

In example 500-1 of FIG. 5-1, the cache interface 214 is configured to form adaptive cache lines 132 in accordance with cache-line parameters specifying $C_{ACL}=C_{HCL}$ (R=1). Therefore, as in example 400-1, the cache interface 214 can form adaptive cache lines 132 from respective hardware cache lines 122, ACL tags 134 from respective HCL tags 124, and adaptive sets 332 from respective hardware sets 322.

In example 500-2 of FIG. 5-2, the cache interface 214 is configured to form adaptive cache lines 132 per cache-line parameters specifying $C_{HCL}=2 \cdot C_{HCL}$ (R=2) in accordance with an inter-set scheme. As illustrated, the cache interface 214 can form adaptive cache lines 132 from groups of hardware cache lines 122 within respective hardware sets 322. The hardware cache lines 122 comprising respective adaptive cache lines 132 can be at the same set index ($I_S$) or way within the respective hardware sets 322 (as illustrated in FIG. 5-2). Alternatively, the adaptive cache lines 132 can be formed from hardware cache lines 122 at deterministic set indexes ($I_S$) or ways within the respective hardware sets 322 (e.g., can be at determined index offsets). In example 500-2, where R=2, the cache interface 214 forms adaptive cache lines 132 from two hardware cache lines 122 in two different hardware sets 322; adaptive cache line 132A-A of adaptive set 332A includes hardware cache line 122A-A of hardware set 322A and hardware cache line 122B-A of hardware set 322B, and so on, with adaptive cache line 132H-N of adaptive set 332H comprising hardware cache line 122L-N or hardware set 322L and hardware cache line 122M-N of hardware set 322M. The cache interface 214 can be further configured to form ACL tags 134 corresponding to the adaptive cache lines 132. The ACL tags 134 may be formed from HCL tags 124 in respective tag sets 324 (different tag sets 324 per the inter-set scheme); ACL tag 134A-A of adaptive cache line 132A-A can be formed from HCL tag 124A-A of tag set 324A and HCL tag 124B-A of tag set 324B, and so on, with ACL tag 134H-N being formed from HCL tag 124L-N of tag set 324L and HCL tag 124M-N of tag set 324M. Although particular examples, of techniques for forming adaptive cache lines 132, ACL tags 134, and/or adaptive sets 332 in accordance with an inter-set scheme are described (e.g., where R=1 or 2), the disclosure is not limited in this regard and could be adapted to support any suitable cache-line aggregation factor R (and/or ratio of $$\frac{C_{ACL}}{C_{HCL}})$$

in accordance with an inter-set or other hardware cache line aggregation scheme.

Figures 1, 2, 3, 4, 5, 6:
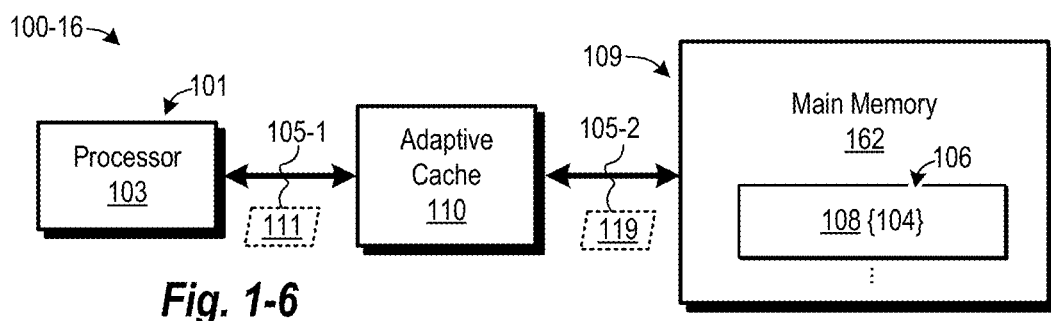

FIG. 6-1 illustrates further example operational implementations of an adaptive cache 110, as disclosed herein. In the FIG. 6-1 example, the cache-line parameters 114 are programmed to set the adaptive cache-line capacity ($C_{ACL}$) to two times the hardware cache-line capacity ($C_{HCL}$), such that the adaptive cache-line ratio (R) is 2. In response, the cache-line manager 212 can configure the cache interface 214 to form adaptive cache lines 132, each adaptive cache line 132 comprising two hardware cache lines 122. The cache interface 214 can be configured to form the adaptive cache lines 132 (and/or adaptive sets 332) in accordance with an inter-set scheme, as disclosed herein. Therefore, and as illustrated in the FIG. 6-1 example, the cache interface 214 can combine hardware cache lines 122 across different hardware sets 322, such that each adaptive cache line 132 includes a hardware cache line 122 from each of a plurality of different hardware sets 322 (and does not include multiple hardware cache lines 122 of the same hardware set 322). The hardware cache lines 122 comprising respective adaptive cache lines 122 can be at the same set index ($I_S$) within each hardware set 322 (or at deterministic offsets). For cache-line parameters 114 where R>1, the cache interface 214 can form H adaptive sets 332 from M hardware sets 322, which can be represented by $$H = \frac{M}{R}.$$

In the FIG. 6-1 example $$\left(\text{for } R = 2 = \frac{C_{ACL}}{C_{HCL}}\right),$$

the cache interface 214 forms $$H = \frac{M}{2}$$

adaptive sets 332, each including N adaptive cache lines 132. Adaptive set 332A includes hardware sets 322A and 322B, and the ways of the adaptive set 332A (adaptive cache lines 132A-A through 132A-N) include hardware cache lines 122 at corresponding set indexes ($I_S$) within hardware sets 322A and 322B. Adaptive cache line 132A-A (way A of adaptive set 332A), which is highlighted in FIG. 6-1, includes hardware cache line 122A-A of hardware set 322A and hardware cache line 122B-A of hardware set 322B. Adaptive cache line 132A-B (way B of adaptive set 332A) includes hardware cache line 122A-B of hardware set 322A and hardware cache line 122B-B of hardware set 322B, and so on, with adaptive cache line 132A-N (way N of adaptive set 332A) comprising hardware cache line 122A-N of hardware set 322A and hardware cache line 122B-N of hardware set 322B. The cache interface 214 can form other adaptive sets 332 in a similar manner; adaptive set 332H can comprise adaptive cache lines 132H-A through 132H-N, each formed from hardware cache lines 122 at corresponding ways within each of hardware sets 322L and 322M (e.g., adaptive cache line 132H-A comprising hardware cache lines 122L-A and 122M-A, adaptive cache line 132H-B comprising hardware cache lines 122L-B and 122M-B, and so on, with adaptive cache line 132H-N comprising hardware cache lines 122L-N and 122M-N). Adaptive cache line 132H-N is also highlighted in FIG. 6-1 for reference. The cache interface 214 can be further configured to form ACL tags 134 for respective adaptive cache lines 132, as disclosed herein (not shown in FIG. 6-1).

Forming adaptive cache lines 132 from hardware cache lines 122 within separate, independent structures (e.g., separate, independent banks) can enable the cache-line manager 212 to improve data access performance. In the FIG. 6-1 example, the ACL capacity 232 of respective adaptive cache lines 132 can be accessed in parallel from respective hardware sets 322; the ACL capacity 232 of adaptive cache line 132A-A can be accessed in parallel from hardware cache line 122A-A (hardware set 322A) and hardware cache line 122B-A (hardware set 322B) and so on, with the ACL capacity 232 of adaptive cache line 132M-N being accessible in parallel from hardware cache line 122L-N (hardware set 322L) and hardware cache line 122M-N (hardware set 322M).

Forming adaptive cache lines 132 from hardware cache lines 122 at deterministic set indexes ($I_S$) within respective hardware sets 322 can enable the cache-line manager 212 to improve lookup performance. Since the hardware cache lines 122 of respective adaptive cache lines 132 are at the same (or deterministic) set indexes ($I_S$) within respective hardware sets 322, the cache-line manager 212 can match addresses 106 to adaptive cache lines 132 using a single tag comparison (a comparison between a single one of the HCL tags 124 of the hardware cache lines 122 included in the adaptive cache line 132 and the tag region 224 of the address 106). The set index ($I_S$) of the hardware cache line 122 associated with the matching HCL tag 124 can be used to determine set indexes ($I_S$) for each of the other hardware cache lines 122 of the adaptive cache line 132. The deterministic set indexing scheme of the cache-line manager 212 can reduce the tag comparisons involved in adaptive cache-line lookup operations by a factor of R (ratio of hardware cache lines 122 to adaptive cache lines 132).

FIG. 6-2 illustrates further example operational implementations of an adaptive cache 110, as disclosed herein. In the FIG. 6-2 example, the cache-line parameters 114 are programmed to set the adaptive cache-line capacity ($C_{ACL}$) to 4 times the hardware cache-line capacity ($C_{HCL}$), such that the adaptive cache-line ratio (R) is 4. In response, the cache-line manager 212 can configure the cache interface 214 to form adaptive cache lines 132 from respective groups of 4 hardware cache lines 122. As illustrated in the FIG. 6-2 example, the cache interface 214 is configured to form adaptive cache lines 132, adaptive sets 332, and/or ACL tags 134 in accordance with an inter-set scheme. The cache interface 214 is configured to combine hardware cache lines 122 across different hardware sets 322 at deterministic set indexes ($I_S$) within each hardware set 322 (e.g., at the same or deterministic ways).

In the FIG. 6-2 example $$\left(\text{for } R = 2 = \frac{C_{ACL}}{C_{HCL}}\right),$$

the cache interface 214 forms $$\frac{M}{4}$$

adaptive sets 332, each including N adaptive cache lines 132 (N ways). Adaptive set 332A includes hardware sets 322A-D, and the ways of the adaptive set 332A (adaptive cache lines 132A-A through 132A-N) include hardware cache lines 122 at corresponding set indexes ($I_S$) within hardware sets 322A-D. Adaptive cache line 132A-A (way A of adaptive set 332A), which is highlighted in FIG. 6-2, includes hardware cache lines 122A-A through 122D-A of hardware sets 322A through 322D, respectively. Adaptive cache line 132A-B (way B of adaptive set 332A) includes hardware cache lines 122B-A through 122B-A through 122B-D of hardware sets 322A through 322D. Further, adaptive cache line 132A-N (way N of adaptive set 332A) includes hardware cache lines 122A-N through 122D-N of hardware sets 322A through 322D. The cache interface 214 can form other adaptive sets 332 in a similar manner; adaptive set 332H can include adaptive cache lines 132H-A through 132H-N, each formed from hardware cache lines 122 at corresponding ways within each of hardware sets 322J-322M (e.g., adaptive cache line 132H-A including hardware cache lines 122J-A through 122M-A, adaptive cache line 132H-B including hardware cache lines 122J-B through 122M-B, and so on, with adaptive cache line 132H-N including hardware cache lines 122J-N through 122M-N). Adaptive cache line 132H-N is also highlighted in FIG. 6-2 for reference.

As illustrated in FIGS. 6-1 and 6-2, addresses 106 of data stored within the adaptive cache 110 may be divided into a tag region 224, set region 226, and offset region 228. The set region 226 may be used to map addresses 106 to respective adaptive sets 332. The number of bits included in the set region 226 can correspond to a scheme by which addresses 106 are mapped to respective adaptive sets 332; e.g., $S_I = S_B \mod C_S$, where $S_B$ is the set region 226 of the address 106, $C_S$ is the number of adaptive sets 332 (e.g., H adaptive sets 332), and $S_I$ is the index of the adaptive set 332 for the address 106. The disclosure is not limited in this regard, however, and could use any suitable technique for distributing addresses 106 between adaptive sets 332 (e.g., hash or the like). The offset region 228 can correspond to a data granularity of the adaptive cache 110. More specifically, the offset region 228 can correspond to a number of addressable data units 104 (or number of addresses 106) capable of being cached within respective adaptive cache lines 132; e.g., $$O_B = \log_2 \frac{C_{ACL}}{A_G},$$

where $O_B$ is the number of bits included in the offset region 228 and $A_G$ is the address granularity of the data units 104 to be stored within the adaptive cache lines 132 (e.g., the size, length, and/or amount of the data units 104 associated with respective addresses 106).

The cache-line manager 212 can be configured to adapt region(s) of the addresses 106 in accordance with the cache-line parameters 114 of the adaptive cache 110 (e.g., per the ACL capacity 232 ($C_{ACL}$) of the adaptive cache lines 132). The cache-line manager 212 can be further configured to access ACL capacity 232 ($C_{ACL}$) of adaptive cache lines 132 in parallel. The parallelism may correspond to a number of hardware sets 322 (or other independently accessible structures) spanned by the adaptive cache lines 132 (and/or adaptive sets 332) formed by the cache interface 214. Table 2 illustrates address bit counts and parallel set accesses for respective cache-line parameters 114; e.g., respective cache line aggregation factors (R), for addresses 106 including 25 bits, $A_G$=32B, and hardware cache-line capacity $C_{HCL}$=64B (each hardware cache line 122 capable of caching 2 addresses 106):

TABLE 2

$S_H$ = 1, $A_G$ = 32B, $C_{HCL}$ = 64B, 25-bit addresses, inter-set aggregation

| 114 {R}        | 1   | 2    | 4    | 8    | 16    |
|----------------|-----|------|------|------|-------|
| $C_{ACL}$      | 64B | 128B | 256B | 512B | 1024B |
| 228 ($O_B$)    | 1   | 2    | 3    | 4    | 5     |
| 226 ($S_B$)    | 12  | 11   | 10   | 9    | 8     |
| 224 (tag)      | 12  | 12   | 12   | 12   | 12    |
| Parallel Set(s)| 1   | 2    | 4    | 8    | 16    |

Figures 1, 2, 3, 4, 5, 6, 7:
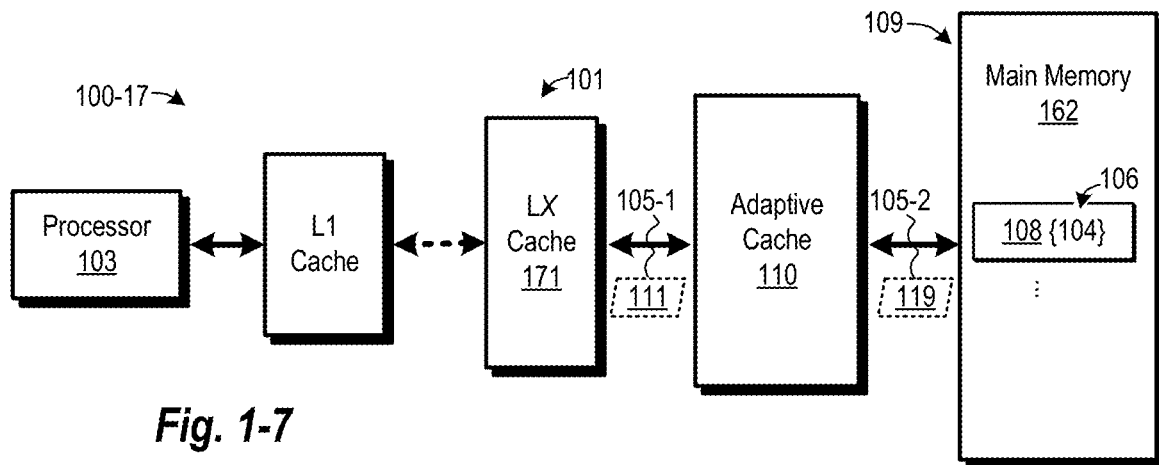

FIG. 7-1 illustrates further example operational implementations of an adaptive cache 110, as disclosed herein. In the FIG. 7-1 example, the hardware cache lines 122 are divided into two hardware segments 422A and 422B (in a sectoring scheme where S=2). The hardware granularity ($G_H$) of the hardware cache lines 122 may, therefore, differ from $C_{HCL}$, such that $$G_H = \frac{C_{HCL}}{2} \text{ or } C_{HCL} = 2 \cdot G_H.$$

The cache-line manager 212 can be configured to form adaptive cache lines 132 having an adaptive cache line capacity ($C_{ACL}$) ranging from $$\frac{C_{HCL}}{S}$$

to a power-of-two multiple of $C_{HCL}$ (where S=2 in accordance with the sectoring scheme of the hardware cache lines 122). In the FIG. 7-1 example, the cache-line parameters 114 specify an $C_{ACL}$ of $G_H$ or $$\frac{C_{HCL}}{2},$$

such that the cache-line aggregation ratio (R) is ½ (two adaptive cache lines 132 per hardware cache line 122). In response, the cache interface 214 can form adaptive cache lines 132 from respective hardware sectors 422 of the hardware cache lines 122. The cache interface 214 can form double the number of adaptive cache lines 132 as hardware cache lines 122. The cache interface 214 can be further configured to form adaptive sets 332, each including P adaptive cache lines 132 (e.g., form P-way adaptive sets 332 from N-way hardware sets 322, where P=R·N or P=2·N, for R=½). As illustrated, adaptive cache line 132A-A (highlighted in FIG. 7-1) can include hardware sector 422A of hardware cache line 122A-A, adaptive cache line 132A-B can include hardware sector 422B of hardware cache line 122A-A, and so on, with adaptive cache line 132H-P (also highlighted in FIG. 7-1) including hardware sector 422B of hardware cache line 122M-N.

The cache interface 214 can reconfigure the adaptive cache lines 132, ACL tags 134, and/or adaptive sets 332 in response to changes to the cache-line parameters 114. In the FIG. 7-2 example, the cache-line parameters 114 are programmed to specify an $C_{ALL}$=4·$G_H$ or $C_{ALL}$=2·$C_{HCL}$ (R=2). In response, the cache interface 214 can reconfigure the cache storage 120 in accordance with an inter-set scheme. The cache interface 214 can form H adaptive sets 332; adaptive set 332A can include hardware sets 322A and 332B, and so on, with adaptive set 332H including hardware sets 322L and 322M. The cache interface 214 can reconfigure the adaptive cache lines 132 in accordance with an inter-set scheme, such that each adaptive cache line 132 includes hardware sectors 422 of two hardware cache lines 122 (hardware cache lines 122 at deterministic indexes within two different hardware sets 322). Adaptive cache line 132A-A (highlighted in FIG. 7-1) includes hardware sectors 422A and 422B of hardware cache line 122A-A and hardware sectors 422A and 422B of hardware cache line 122B-A, and so on, with adaptive cache line 132H-N (also highlighted in FIG. 7-1) including hardware sectors 422A and 422B of each of hardware cache lines 122L-N and 122M-N.

As disclosed herein, the cache-line manager 212 can be configured to map addresses 106 to adaptive cache lines 132, which can include: a) using the least significant bits of the address 106 to select an adaptive set 332 in every way (e.g., contents of the set region 226), and b) compare the most significant bits of the address 106 (e.g., the tag region 224) to ACL tags 134 of the adaptive cache lines 132 of the selected adaptive set 332. The cache-line manager 212 can adapt region(s) of the addresses 106 in accordance with the cache-line parameters 114 of the adaptive cache 110 (e.g., per the ACL capacity 232 ($C_{ACL}$) of the adaptive cache lines 132). The cache-line manager 212 can be further configured to access ACL capacity 232 ($C_{ACL}$) of adaptive cache lines 132 in parallel. The parallelism may correspond to a number of hardware sets 322 (or other structure) spanned by the adaptive cache lines 132 (and/or adaptive sets 332) formed by the cache interface 214.

Table 3 illustrates address bit counts and parallel set accesses for respective cache-line parameters 114 for an adaptive cache 110 that includes sectored hardware cache lines 122 as illustrated in FIGS. 7-1 and 7-2 under respective cache line aggregation factors (R); e.g., for addresses 106 including 25 bits, $A_G$=32B, and hardware cache-line capacity $C_{HCL}$=64B (each hardware cache line 122 capable of caching two addresses 106 within respective hardware sectors 422A and 422B):

TABLE 3

| 114 {R}        | ½    | 1    | 2     | 4     | 8     | 16     |
|----------------|------|------|-------|-------|-------|--------|
| $C_{ACL}$      | 32 B | 64 B | 128 B | 256 B | 512 B | 1024 B |
| 228 ($O_B$)    | 0    | 1    | 2     | 3     | 4     | 5      |
| 226 ($S_B$)    | 13   | 12   | 11    | 10    | 9     | 8      |
| 224 (tag)      | 12   | 12   | 12    | 12    | 12    | 12     |
| Parallel Set(s)| 1    | 1    | 2     | 4     | 8     | 16     |

$S_H$ = 1, $A_G$ = 32 B, $C_{HCL}$ = 64 B, S = 2, 25-bit addresses, inter-set aggregation Although particular examples, of techniques for forming adaptive cache lines 132, ACL tags 134, and/or adaptive sets 332 from sectored hardware cache lines 122 in accordance with an intra-set scheme are described herein (e.g., where R=½ or 2 as illustrated in FIGS. 7-1 and 7-2, respectively), the disclosure is not limited in this regard and could be adapted to support any suitable cache-line aggregation factor R (and/or ratio of $$\frac{C_{ACL}}{C_{HCL}}\Big)$$

and/or hardware sectoring (S) in accordance with an intra-set or other scheme.

Figures 1, 2, 3, 4, 5, 6, 7, 8:
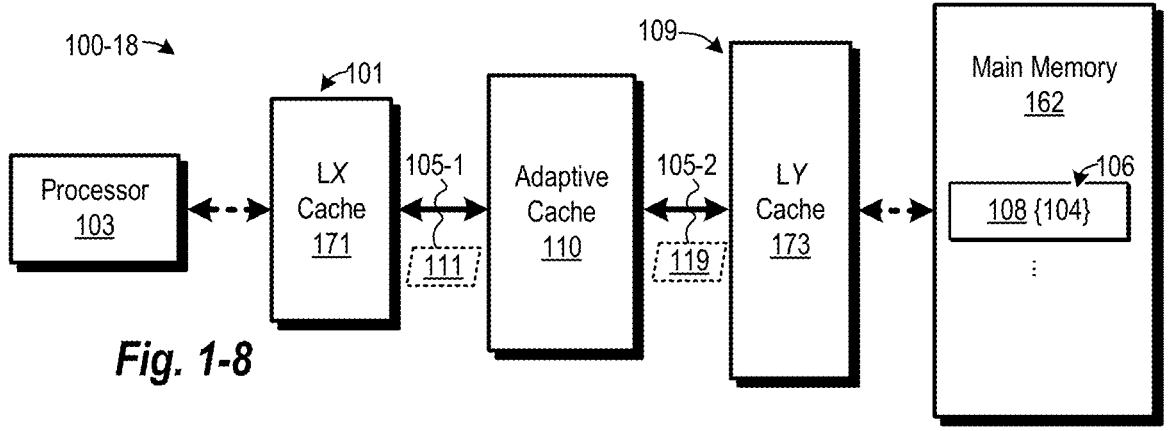
Figure 2:
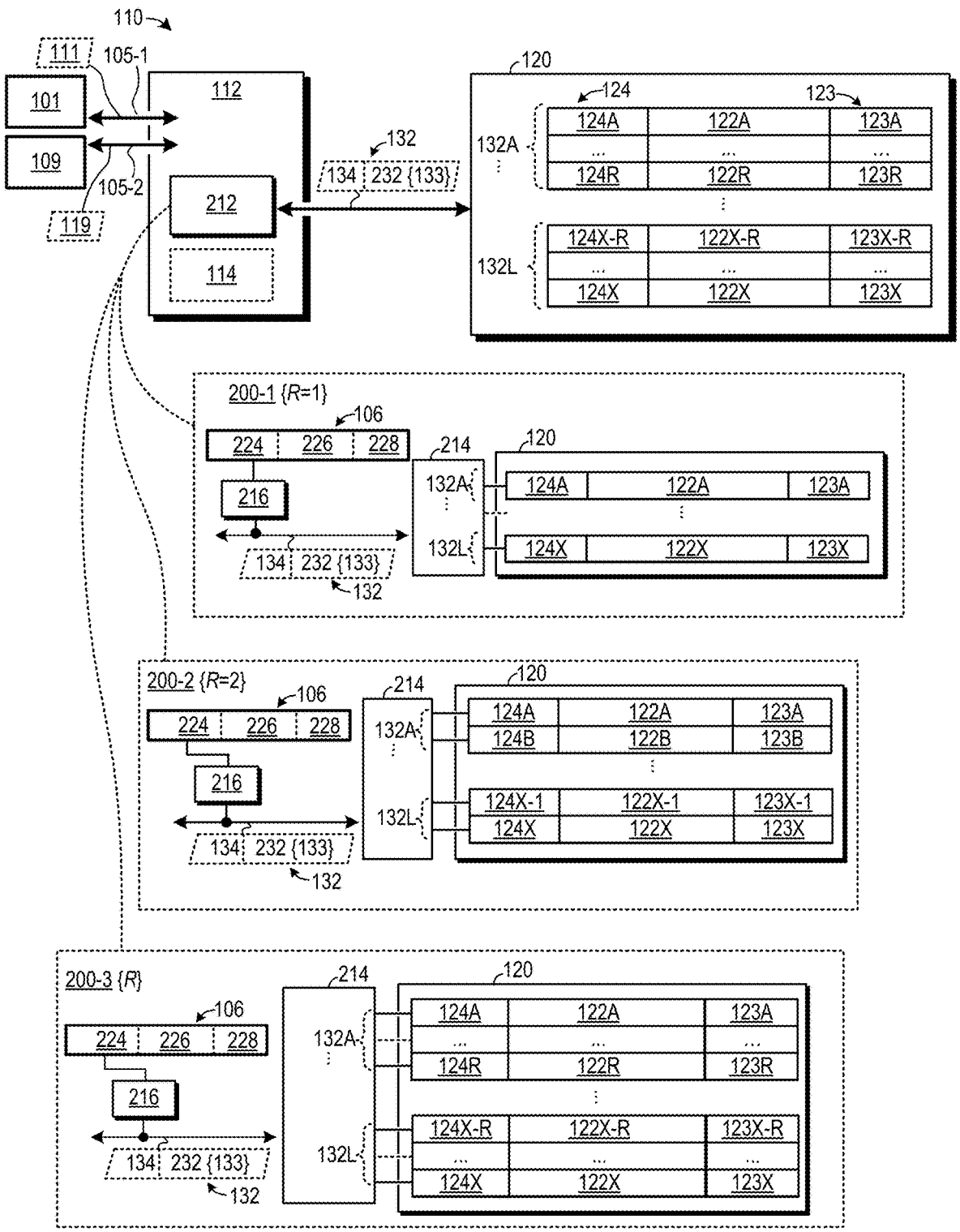
Figure 3:
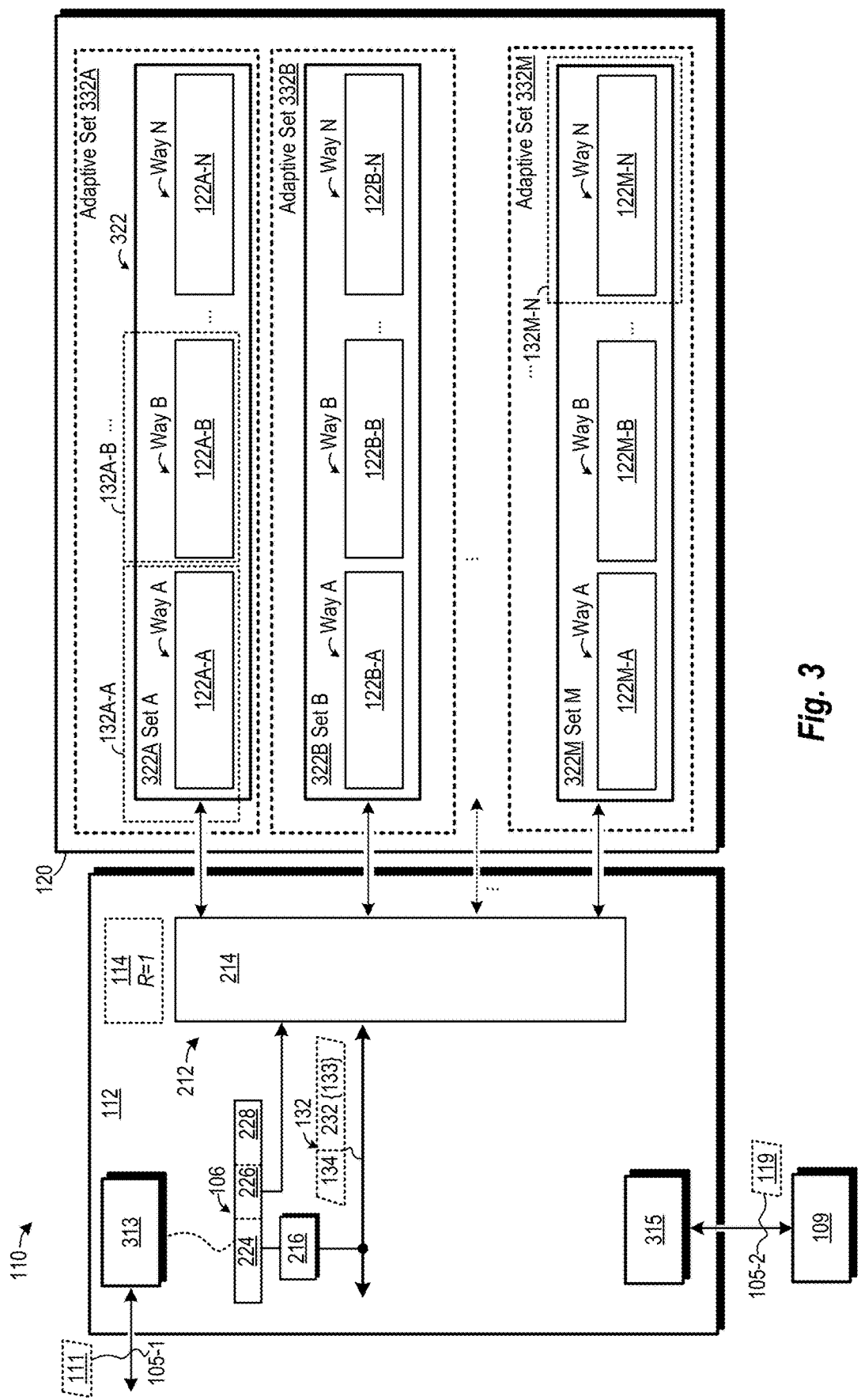
Figure 4:
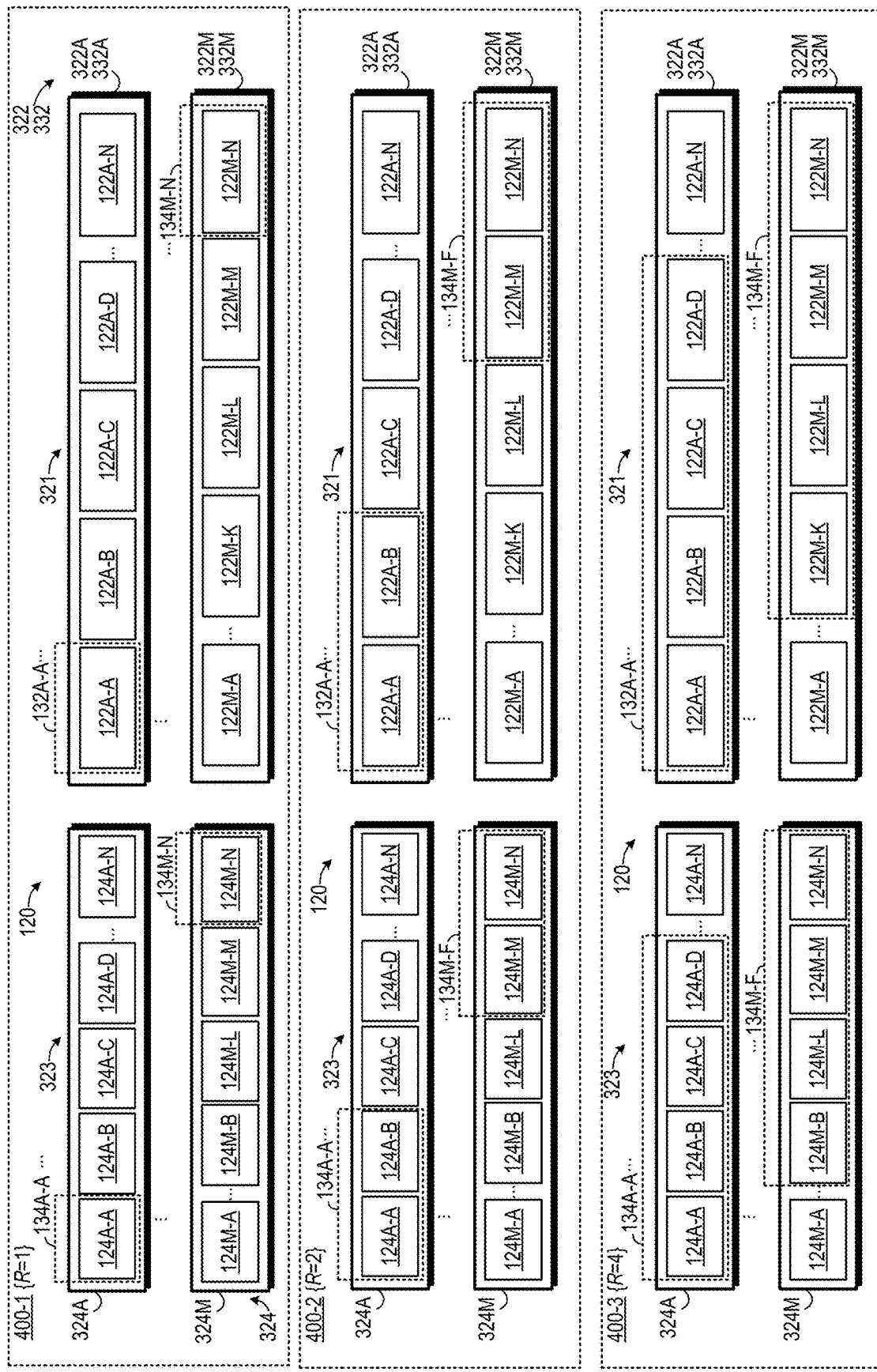
Figures 1, 6:
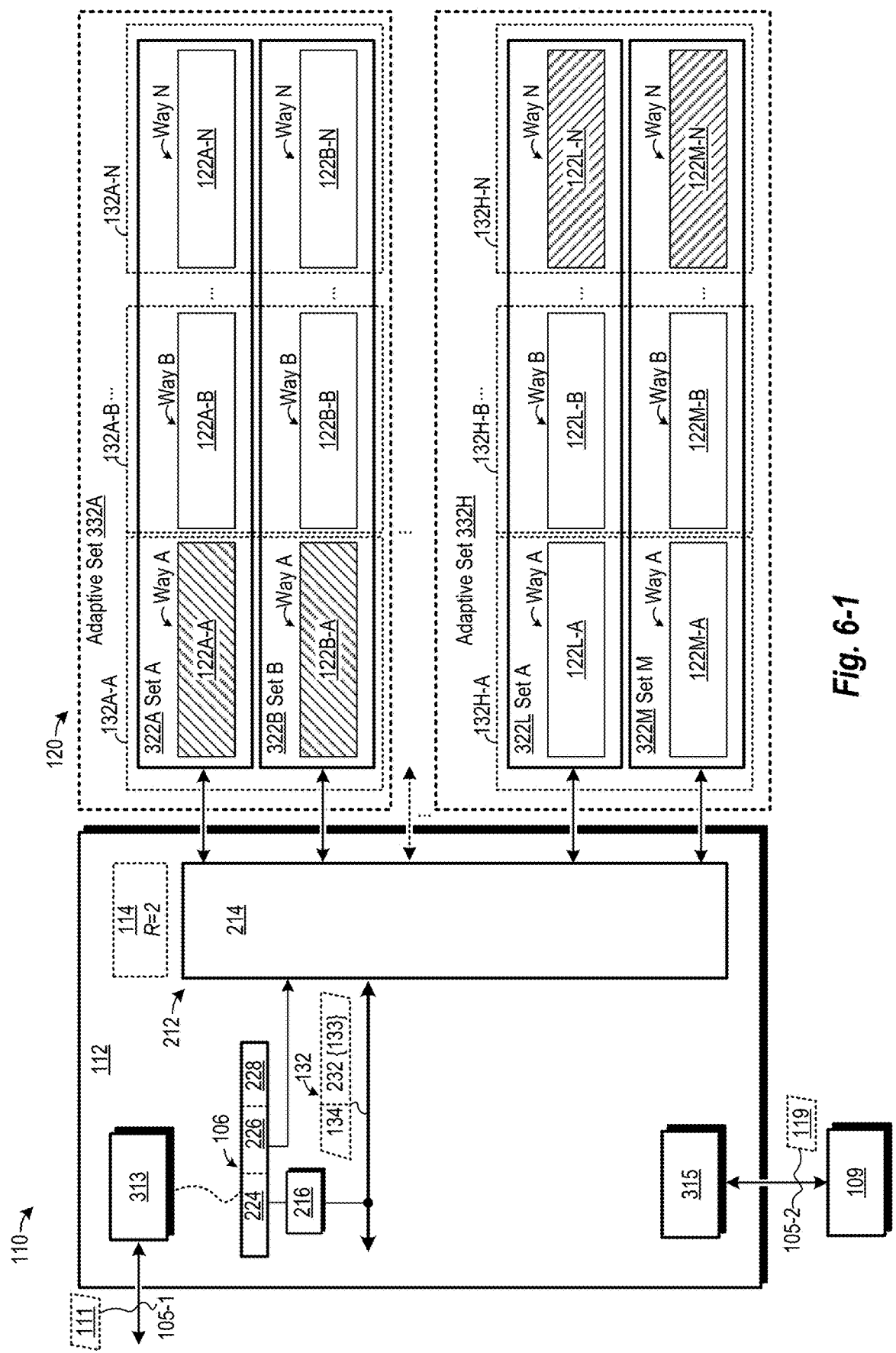
Figures 2, 6:
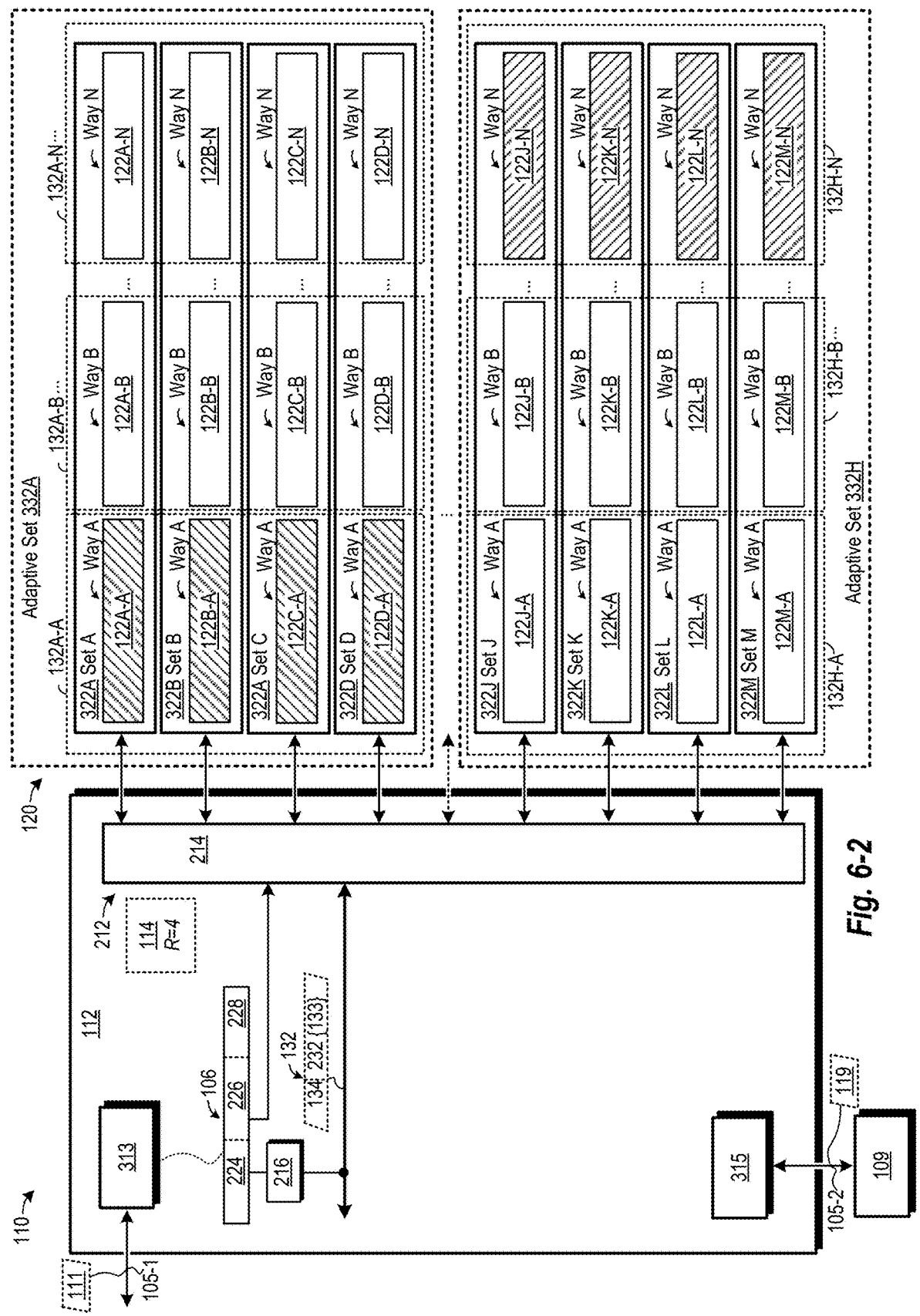
Figures 1, 7:
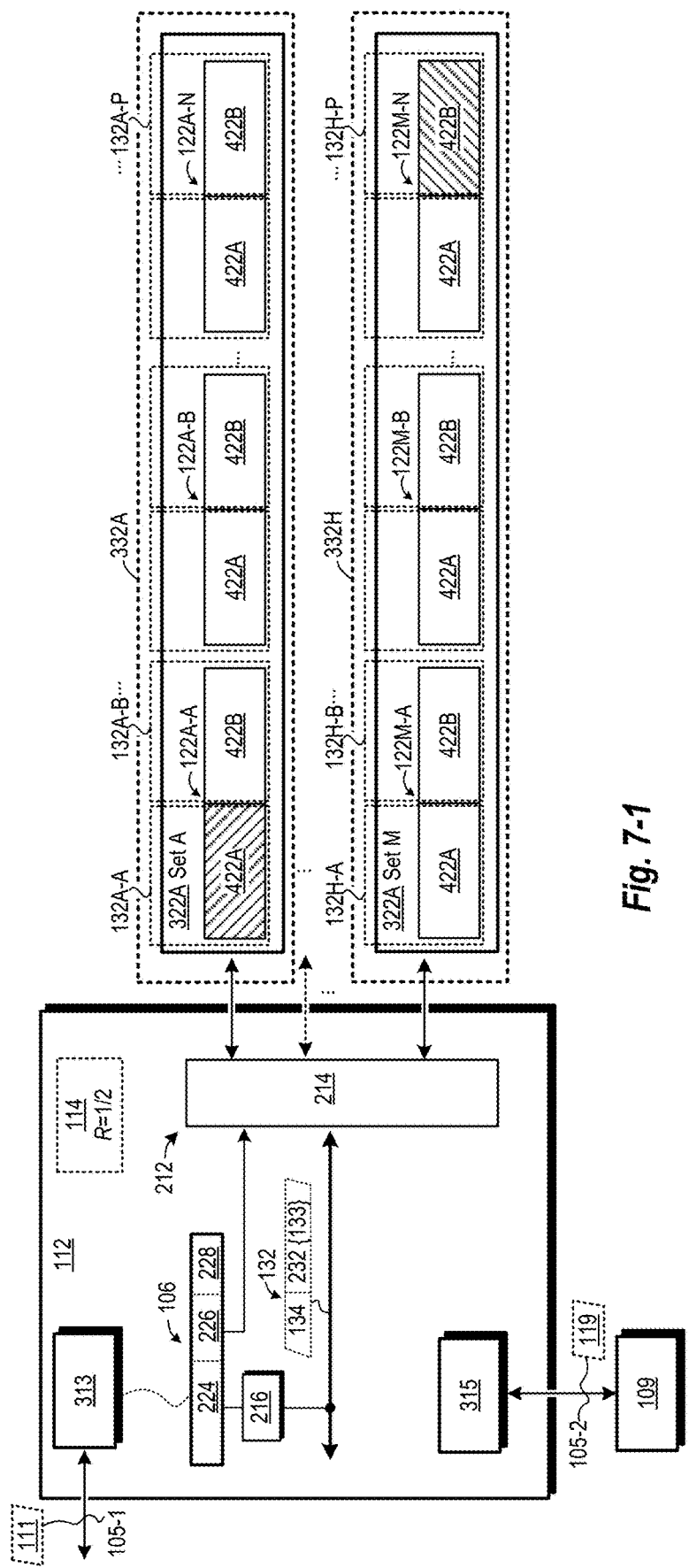
Figures 2, 7:
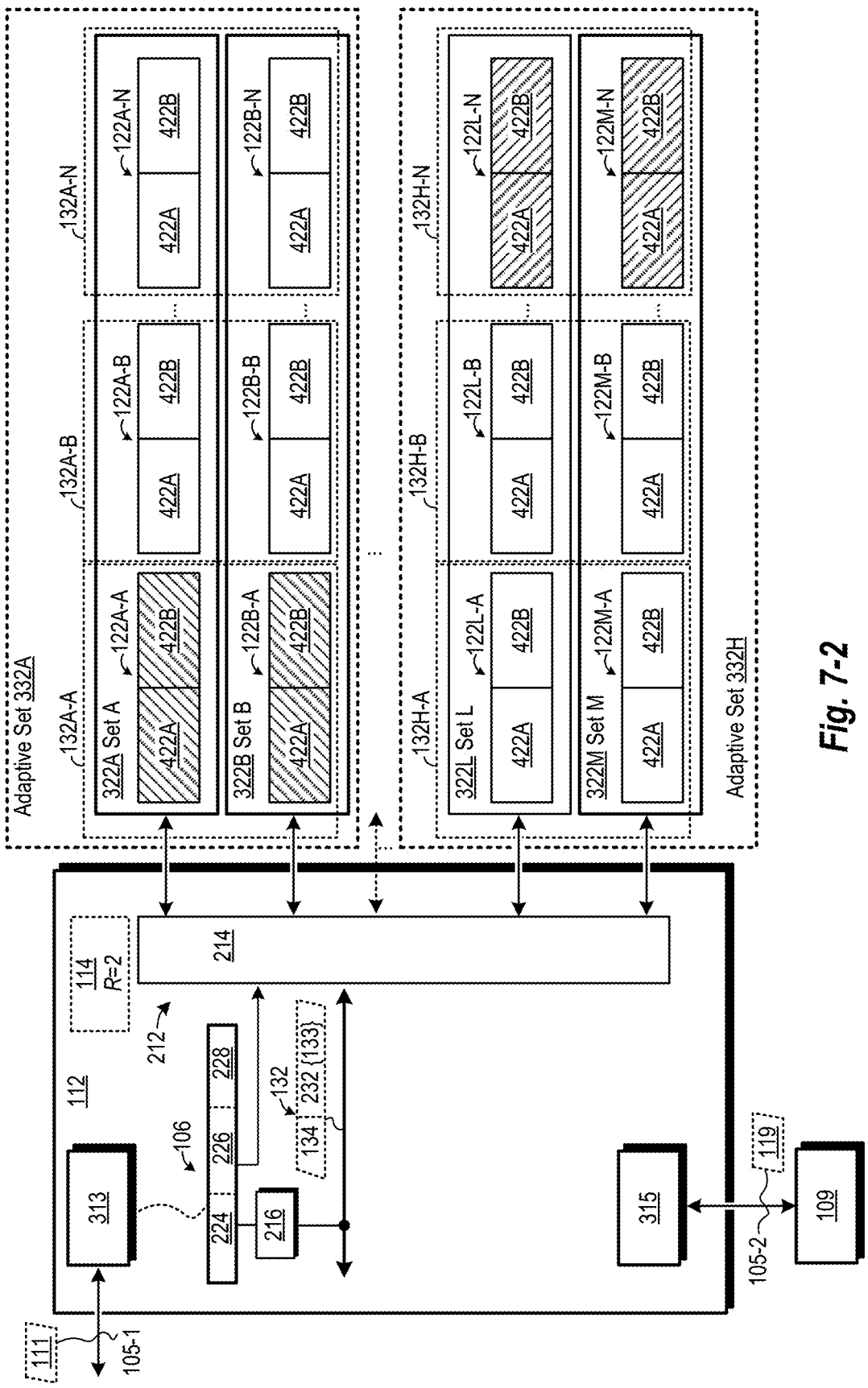
Figure 8:
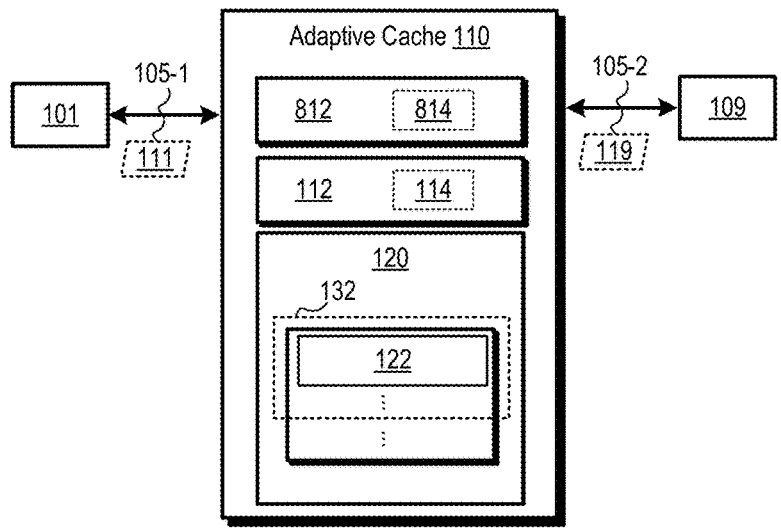

FIG. 8 illustrates further example operational implementations of an adaptive cache 110 as disclosed herein. In the FIG. 8 example, the adaptive cache 110 includes and/or is coupled to an adaptation engine 812 configured to, inter alia, determine, adjust, refine, and/or otherwise manage cache-line parameters 114 of the adaptive cache 110. The adaptation engine 812 can be configured to determine cache metrics 814, which can include information pertaining to the workload on the adaptive cache 110, cache performance metrics, and so on. The cache metrics 814 can indicate a sequentiality of the workload. The cache metrics 814 can quantify a degree to which addresses 106 of requests 111 received at the adaptive cache 110 are sequential and/or contiguous. In some aspects, the adaptation engine 812 monitors addresses 106 of requests 111 during respective time windows. The cache metrics 814 can include information pertaining to workload patterns, such as predicted workload characteristics during particular times (e.g., predicted sequentiality). The cache metrics 814 can include information pertaining to processing tasks being executed on the computing device and/or associate the processing tasks with workload characteristics (e.g., associate processing tasks and/or applications with corresponding workload characteristics). By way of non-limiting example, the cache metrics 814 can indicate that a video editing application determined to produce sequential workloads is scheduled for execution. In another non-limiting example, the cache metrics 814 can indicate that the computing device is executing a DBMS application determined to produce non-sequential workloads. The adaptation engine can learn workload patterns (and/or workload patterns for particular processing tasks) using a suitable machine-learning technique. The disclosure is not limited in this regard, however, and could be adapted to monitor, determine quantify, model, and/or predict workload characteristics (e.g., sequentiality) using any suitable technique. In some aspects, the cache metrics 814 include information pertaining to cache performance, such as cache miss rate, cache hit rate, and/or the like. The cache metrics 814 can further include and/or incorporate information pertaining to a current configuration of the adaptive cache 110, such as current cache-line parameters 114, adaptive cache-line capacity ($C_{ACH}$), cache transfer granularity ($G_T$), and so on.

The adaptation engine 812 can be further configured to determine and/or adjust the cache-line parameters 114 based on, inter alia, the cache metrics 814. The adaptation engine 812 can determine and/or adjust cache-line parameters 114 in accordance with the workload on the adaptive cache 110. The adaptation engine 812 can be configured to adjust the capacity of the adaptive cache lines 132 managed by the controller 112 (e.g., adjust $C_{ACL}$) in response to one or more of: sequentiality of the workload, predicted sequentiality of the workload, changes to workload sequentiality, cache performance metrics, cache miss rate, cache hit rate, processing task(s) being executed by the computing device, processing task(s) scheduled for execution on the computing device and/or the like. The adaptation engine 812 can be configured to increase cache-line prefetch in response to sequential workloads, decrease cache-line prefetch in response to non-sequential workloads, and so on. The adaptation engine 812 can be further configured to selectively increase or decrease cache-line prefetch in response to cache metrics 814 indicating increased cache miss rate or decreased cache hit rate (based on workload characteristics, such as sequentiality). In some aspects, the adaptation engine 812 can determine cache-line parameters 114 for respective workload conditions and can apply the determined cache-line parameters 114 in response to detecting and/or predicting corresponding workload conditions. In some aspects, the adaptation engine 812 includes machine-learned (ML) cache-line parameters 114 for respective workloads, e.g., cache-line parameters 114 determined to result in optimal cache performance under respective workload conditions. The adaptation engine 812 can be trained to learn the optimal cache-line parameters 114 through a suitable machine-learning technique.

The adaptive cache 110 can be configured to apply cache-line parameters 114. The adaptive cache 110 can apply cache-line parameters 114 determined and/or modified by the adaptation engine 812. Applying modified cache-line parameters 114 can include configuring the controller 112 to reconfigure the adaptive cache lines 132 in accordance with the modified cache-line parameters 114. Reconfiguring the adaptive cache lines 132 can include reforming the adaptive cache lines 132 from different groups of hardware cache lines 122 (e.g., to modify the $C_{ACH}$ of the adaptive cache lines 132 by, inter alia, modifying the quantity of hardware cache lines 122 and/or hardware segments 422 included in respective adaptive cache lines 132). The reconfiguring can include flushing the working set from the adaptive cache lines 132, reconfiguring the adaptive cache lines 132, and reloading the working set (or a portion of the working set) into the reconfigured adaptive cache lines 132. The "working set" refers to the set of data cached within the adaptive cache 110. The controller 112 can be configured to retain working set metadata in response to reconfiguring the adaptive cache lines 132 (and/or flushing the adaptive cache 110). The working set metadata may identify the address ranges previously loaded into the adaptive cache 110; the working set metadata may include a plurality of address ranges, each corresponding to the data cached within a respective one of the adaptive cache lines 132 prior to reconfiguration. The working set metadata can further include information pertaining to the address ranges, such as admission time, access times, access frequency, and so on. The extent of the address ranges may correspond to the $C_{ACL}$ of the adaptive cache lines 132. The controller 112 can be further configured to use the retained working set metadata to reload the working set (and/or portions thereof) into the reconfigured cache lines 132. Reloading the working set can include loading data of the previously loaded address ranges. The $C_{ACL}$ of the reconfigured adaptive cache lines 132 may differ from the previous $C_{ACL}$ and, as such, one or more of the address ranges may be omitted (or extended) during readmission. In some aspects, the cache controller 112 selects address ranges to reload (or exclude) based on, inter alia, a replacement or readmission policy, such as FIFO, LIFO, LRU, TLRU, MRU, LFU, random replacement, and/or the like.

Example Methods for an Adaptive Cache

Figure 9:
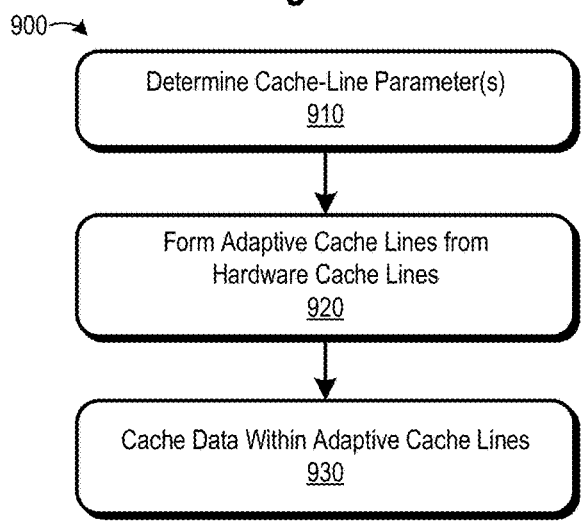
FIG. 9 illustrates an example flowchart depicting operations for providing a cache that includes adaptive cache lines.

Example methods are described in this section with reference to the flow charts and flow diagrams of FIGS. 9 through 13. These descriptions reference components, entities, and other aspects depicted in FIGS. 1 through 8 by way of example only. FIG. 9 illustrates with flow diagram 900 example methods for operation of an adaptive cache 110, as disclosed herein. At 910, the adaptive cache 110 determines one or more cache-line parameters 114, such as a target granularity for adaptive cache lines 132 ($G_A$) to be formed by a controller 112 of the adaptive cache 110, a target capacity for the adaptive cache lines 132 ($C_{ACL}$), cache-line aggregation ratio (R), or other parameter. At 910, the cache-line parameters 114 can be accessed from internal memory storage of the adaptive cache 110, such as a register, EEPROM, firmware, and/or the like. Alternatively, or in addition, the cache-line parameters 114 can be received from external memory storage, through an interconnect, and/or the like. The cache-line parameters 114 can be determined during initialization of the adaptive cache 110. Alternatively, the cache-line parameters 114 can be determined in response to modified cache-line parameters 114.

At 920, adaptive cache lines 132 are formed hardware cache lines 122 in accordance with the cache-line parameters 114, as disclosed herein. The adaptive cache lines 132 can be formed from respective groups of hardware cache lines 122, each adaptive cache line 132 formed from a respective group of R hardware cache lines 122, where $$R = \frac{C_{ACL}}{C_{HCL}}.$$

When the cache-line parameters 114 specify an adaptive cache-line size ($C_{ACL}$) less than or equal to the hardware cache-line size ($C_{HCL}$), 920 can include interleaving adaptive cache lines 132 across respective rows or sets of hardware cache lines 122. When the cache-line parameters 114 specify an $C_{ACL}$ greater than $C_{HCL}$ (e.g., a power of 2 multiple), 920 can include grouping hardware cache lines 122 in accordance with a selected aggregation scheme, such as an intra-set scheme, an inter-set scheme, or the like.

In an intra-set scheme, the adaptive cache lines 132 may be formed from hardware cache lines 122 within respective hardware sets 322, which may include forming M adaptive sets 332 from M hardware sets 322, each adaptive set 332 being F-way associative, where $$F = \frac{N}{R}$$

and N is the set associativity of the hardware sets 322 (e.g., forming the same number of associative sets 332 while reducing set associativity). In an inter-set scheme, the adaptive cache lines 132 may be formed from hardware cache lines 122 within different hardware sets 322, which may include forming H adaptive sets 332 from M hardware sets 322, each adaptive set 332 being N-way associative, where $$H = \frac{N}{R}$$

(e.g., forming a reduced number of adaptive sets 332 while preserving set associativity). The adaptive cache lines 132 can be formed from hardware cache lines 122 within independently accessible memory structures such that the hardware cache lines 122 of respective cache lines 132 can be accessed at least partially in parallel. In some aspects, the hardware cache lines 122 (and corresponding HCL tags 124) are banked across respective rows (hardware sets 322), and the adaptive cache lines 132 are formed from hardware cache lines 122 at the same (or deterministic) set index ($I_S$) within each of R different rows. Forming the adaptive cache lines 132 can further include determining an address scheme by, inter alia, dividing addresses 106 into one or more regions, including a tag region 224, a set region 226, and an offset region 228. The tag region 224 may correspond to the HCL tags 124 of the hardware cache lines 122; the number of bits included in the tag region 224 ($T_B$) may correspond to a number of bits included in respective HCL tags 124. The number of bits included in the offset region 228 ($O_B$) may be a function of $C_{ACL}$ in terms of addresses 106 (or data units 104), where $O_B = \log_2 C_{ACL}$, and the number of bits included in the set region 226 ($S_B$) may be $A_B - (T_B + O_B)$, where $A_B$ is the number of bits included in respective addresses 106. A set mapping scheme for associating addresses 106 with respective adaptive sets 332 can also be determined at 920; the set mapping scheme may define deterministic mappings between the set regions 226 of respective addresses 106 and adaptive sets 332 formed in accordance with the cache-line parameters 114. The set mapping scheme can include any suitable scheme including, but not limited to a modulo scheme, a hash scheme, and/or the like.

At 930, data of a backing memory 109 can be cached within the adaptive cache lines 132, which can include transferring data into respective adaptive cache lines 132 (in response to cache misses), reading and/or writing data cached within respective adaptive cache lines 132 (in response to cache hits), and so on. Transferring data into an adaptive cache line 132 can include loading data into a plurality of hardware cache lines 122 and associating the plurality of hardware cache lines 122 with a single tag. Accessing data of an adaptive cache line 132 can include accessing cache capacity of the plurality of hardware cache lines 122 (e.g., reading and/or writing data to the plurality of hardware cache lines 122). Caching data can further include associating addresses 106 with adaptive cache lines 132, by: a) selecting an adaptive set 332 based on contents of the set region 226 of the address 106 (in accordance with a set mapping scheme), and b) comparing contents of the tag region 224 of the address 106 to ACL tags 134 of the adaptive cache lines 132 of the selected adaptive set 332, wherein a match between the tag region 224 and an ACL tag 134 results in a cache hit, and failure to identify a matching ACL tag 134 results in a cache miss. The operations performed at 930 can further include performing cache transfers 119 between the backing memory 109 and respective adaptive cache lines 132. The granularity of the cache transfers 119 (e.g., amount of data transferred between the adaptive cache 110 and backing memory 109 in respective cache transfers 119) may correspond to the capacity of the adaptive cache lines 132 ($C_{ACL}$).

Figure 10:
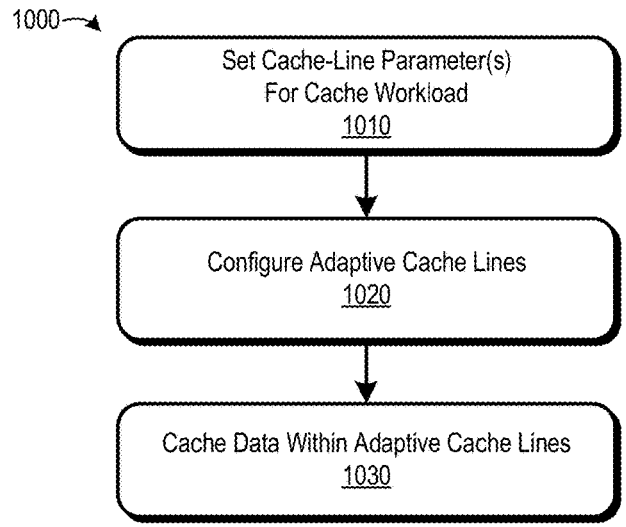
FIG. 10 illustrates an example flowchart depicting operations for adapting a cache for a cache workload having specified characteristics.

FIG. 10 illustrates with flow diagram 1000 further example methods for operation of an adaptive cache 110, as disclosed herein. Flow diagram 1000 depicts example methods for configuring an adaptive cache 110 to efficiently service a cache workload having specified characteristics, such as a sequential workload, non-sequential workload, a workload of a particular application, a workload of a particular processing task, and/or the like.

At 1010, cache-line parameters 114 for a particular cache workload can be set. The cache-line parameters 114 can be set through any suitable mechanism including, but not limited to: transmitting the cache-line parameters 114 to the adaptive cache 110, communicating a command, directive, or other message on an interconnect, such as the first or front-end interconnect 105-1, programming firmware of the adaptive cache 110, writing to a register or other memory storage of the adaptive cache 110, and/or the like. The cache-line parameters 114 set can be adapted for a specified cache workload. The cache-line parameters 114 can correspond to workload characteristics, such as workload sequentiality (a sequential workload, non-sequential workload, or the like). Alternatively, or in addition, the cache-line parameters 114 can be adapted for a particular application or processing task of a requestor 101 (e.g., a host 102, memory storage system 150, processor 103, computing device, and/or the like).

The cache-line parameters 114 can be set in response to detecting execution of a particular application or processing task and/or determining that the application or processing task is scheduled for execution. The cache-line parameters 114 of 1010 can include sequential cache-line parameters 114 adapted to configure the adaptive cache 110 to efficiently service sequential cache workloads. The sequential cache-line parameters may specify large, high-capacity adaptive cache lines 132 (an $C_{ACL}$ of 256B, 1024B, or the like), a large aggregation factor (e.g., 8, 16, 32, or the like), and so on, which may result in a high degree of cache-line prefetch. Alternatively, the cache-line parameters 114 of 1010 can include non-sequential cache-line parameters 114 adapted to configure the adaptive cache 110 to efficiently service non-sequential cache workloads. The non-sequential cache-line parameters may specify small, low-capacity adaptive cache lines 132 (e.g., 32B, 64B, or the like), a small aggregation factor $$\left(\text{e.g.,} \frac{1}{S} C_{HCL},\right.$$

$C_{HCL}$, or the like), and so on, which may result in a low degree of cache-line prefetch.

At 1020, the controller 112 of the adaptive cache 110 forms adaptive cache lines 132 in accordance with the cache-line parameters 114 set at 1010, which may include combining groups of hardware cache lines 122 into respective adaptive cache lines 132, combining groups of HCL tags 124 into respective ACL tags 134, and so on, as disclosed herein. The adaptive cache lines 132 can be formed from hardware cache lines 122 capable of being accessed at least partially in parallel. The adaptive cache lines 132 can be formed from hardware cache lines 122 at the same (or deterministic) set indexes ($I_S$) within respective hardware sets 322 (different banks or other memory structures capable of independent and/or parallel access). The operations performed at 1020 can further include combining hardware sets 322 into respective adaptive sets 332, determining a set mapping scheme (e.g., determining an address segmentation scheme), and so on, as disclosed herein. In some aspects, 1020 can further include flushing a working set from the cache storage 120, reconfiguring the adaptive cache lines 132, and reloading portions of the working set.

At 1030, data of a backing memory 109 are cached within the adaptive cache lines configured at 1020, as disclosed herein, which can include receiving requests 111 pertaining to the backing memory 109 and servicing the requests 111 by use of the cache storage 120. Servicing a request 111 can include determining whether the request results in a cache hit by, inter alia, attempting to map an address 106 of the request 111 to an adaptive cache line 132, by: (a) selecting an adaptive set 332 based on set bits of the address 106 (contents of a set region 226 of the address 106), and (b) comparing tag bits of the address 106 (contents of a tag region 224 of the address 106) to ACL tags 134 associated with the adaptive cache lines 132 of the selected adaptive set 332. The servicing can further include loading data corresponding to the address into a selected adaptive cache line 132 in response to a cache miss, which may include performing a cache transfer 119 to populate the selected adaptive cache line 132 with data of the backing memory 109.

Performing the cache transfer 119 may include transferring an amount of data corresponding to the $C_{ACL}$ of the adaptive cache lines 132, as specified by the cache-line parameters 114 set at 1010. Alternatively, servicing the request 111 can include reading and/or writing data to an adaptive cache line 132 in response to a cache hit, which may include reading and/or writing data to a plurality of hardware cache lines 122 at least partially in parallel.

Figure 11:
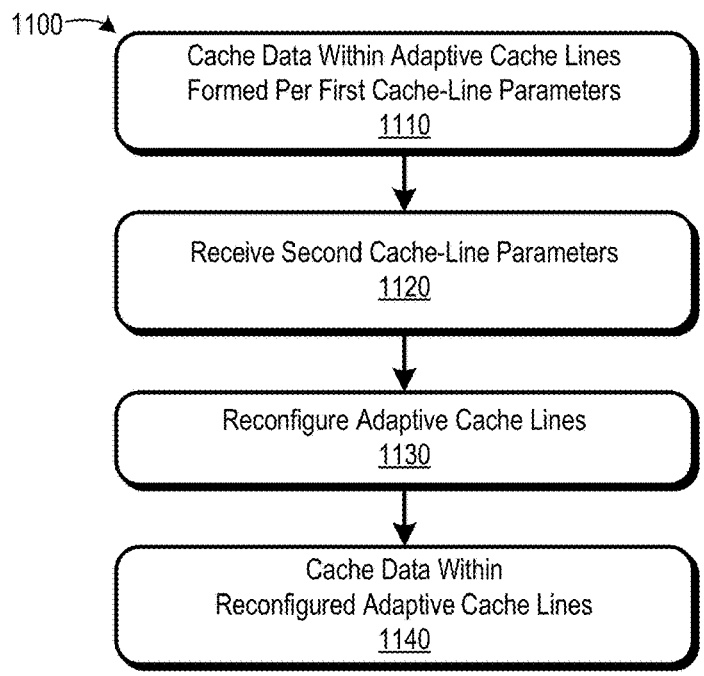
FIG. 11 illustrates an example flowchart depicting operations for reconfiguring adaptive cache lines.

FIG. 11 illustrates with flow diagram 1100 further example methods for operation of an adaptive cache 110, as disclosed herein. At 1110, data may be cached within adaptive cache lines 132 formed in accordance with first cache-line parameters 114 (e.g., a first capacity parameter). The operations of 1110 may include forming the adaptive cache-lines to have a first $C_{ACL}$ by, inter alia, combining groups including a first quantity of hardware cache lines 122. The first quantity can be a ratio of the first $C_{ACL}$ (or first capacity parameter) to the fixed capacity of the hardware cache lines 122 ($C_{HCL}$). In some aspects, 1110 can further include performing cache transfers 119 between backing memory 109 and respective adaptive cache lines 132 at a first transfer granularity ($G_T$); performing a cache transfer 119 to load data into an adaptive cache line 132 having the first $C_{ACL}$ can include requesting an amount of data corresponding to the first $C_{ACL}$ from the backing memory 109, performing a cache transfer 119 to destage a dirty adaptive cache line 132 having the first $C_{ACL}$ can include writing an amount of data corresponding to the first $C_{ACL}$ to the backing memory 109, and so on.

At 1120, second cache-line parameters 114 can be received at the adaptive cache 110. The second cache-line parameters 114 can be received through an interconnect, such as a first or front-end interconnect 105-1, a second or back-end interconnect 105-2, and/or the like. Alternatively, or in addition, the second cache-line parameters 114 can be determined and/or adjusted by the adaptive cache 110; e.g., may include and/or be coupled to an adaptation engine 812 of the adaptive cache 110 determining modified cache-line parameters 114 (modified capacity parameter), as disclosed herein. The second cache-line parameters 114 may modify the capacity of the adaptive cache lines 132 ($C_{ACL}$). The second cache-line parameters 114 include a second capacity parameter that specifies a second capacity for the adaptive cache lines 132 different from the first capacity.

At 1130, the adaptive cache lines 132 can be reconfigured per the second cache-line parameters 114. The adaptive cache lines 132 can be reconfigured to have a second $C_{ACL}$ by, inter alia, aggregating groups, each including a second quantity of hardware cache lines 122. In some aspects, 1130 includes flushing and/or evicting the working set from the adaptive cache 110 before reconfiguring the adaptive cache lines 132 (e.g., writing dirty adaptive cache lines 132 back to the backing memory 109).

At 1140, data of the backing memory 109 can be cached within the reconfigured adaptive cache lines 132. In some aspects, 1140 may include loading at least a portion of the working set into the adaptive cache 110 (e.g., transferring data from the backing memory 109 into the reconfigured adaptive cache lines 132). The operations of 1140 can include performing cache transfers 119 between backing memory 109 and respective adaptive cache lines 132 at a second transfer granularity ($G_T$) corresponding to the second $C_{ACL}$. Performing a cache transfer 119 to load data into an adaptive cache line 132 having the second $C_{ACL}$ can include requesting an amount of data corresponding to the second $C_{ACL}$ from the backing memory 109, performing a cache transfer 119 to destage a dirty adaptive cache line 132 having the second $C_{ACL}$ can include writing an amount of data corresponding to the second $C_{ACL}$ to the backing memory 109, and so on.

Figure 12:
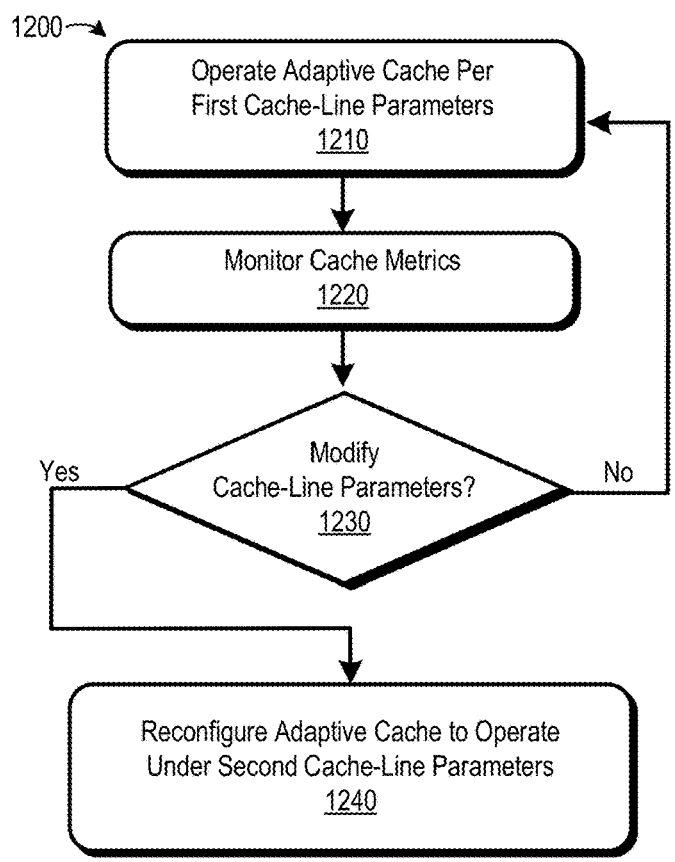
FIG. 12 illustrates an example flowchart depicting operations for configuring adaptive cache lines in response to a cache workload.

FIG. 12 illustrates with flow diagram 1200 further example methods for operation of an adaptive cache 110, as disclosed herein. At 1210, the adaptive cache 110 is configured to operate in accordance with first cache-line parameters 114, which may include forming adaptive cache lines 132 configured to have a first $C_{ACL}$ specified by the first cache-line parameters 114. The adaptive cache lines 132 may be formed from respective groups of hardware cache lines 122, each adaptive cache line 132 formed from a first quantity of hardware cache lines 122. Forming the adaptive cache lines 132 may further include forming ACL tags 134 from HCL tags 124 by, inter alia, linking a plurality of hardware cache lines 122 to one of a plurality of HCL tags 124 (e.g., a single ACL tag 134). The operations performed at 1210 may further include caching data within the adaptive cache lines 132, which may include performing cache transfers 119 at a first granularity ($G_T$), as disclosed herein.

At 1220, an adaptation engine 812 can monitor cache metrics 814 during operation of the adaptive cache 110 under the first cache-line parameters 114, which may include monitoring and/or predicting characteristics of the workload on the adaptive cache 110, such as workload sequentiality. In some aspects, 1220 can further include monitoring cache performance metrics, such as cache hit rate, cache miss rate, and so on the cache metrics 814 may be monitored over time (e.g., during respective time intervals). The monitoring at 1220 can include developing, training, and/or refining ML or statistical model(s) of workload characteristics, such as a normal distribution of workload sequentiality; e.g., $$f(x) = \frac{1}{\sigma\sqrt{2\pi}} e^{-\frac{1}{2}(\frac{x-\mu}{\sigma})^2},$$

where x is workload sequentiality. The adaptation engine 812 can be further configured to monitor processing tasks (and/or applications) being performed by a computing device (and/or scheduled to be performed). The monitoring at 1220 can include detecting execution of tasks determined to produce workloads having particular characteristics, such as execution of a video editing application determined to produce sequential cache workloads, a DBMS determined to produce non-sequential cache workloads, or the like.

At 1230, the adaptation engine 812 determines whether to modify the cache-line parameters 114. The determination of 1230 can be based on, inter alia, the monitoring at 1220. In some aspects, 1230 can include modifying the capacity of the adaptive cache lines 132 ($C_{ACL}$) and/or cache-line prefetch of the adaptive cache 110. The adaptation engine 812 can determine to modify the cache-line parameters 114 in response to one or more of: sequentiality of the workload, predicted sequentiality of the workload, a change in workload sequentiality ($\Delta S$), cache miss rate, cache hit rate, processing task(s) being executed by the computing device, processing task(s) scheduled for execution on the computing device, and/or the like. The adaptation engine 812 can be configured to increase cache-line prefetch in response to sequential workloads, decrease cache-line prefetch in response to non-sequential workloads, and so on. At 1230, the adaptation engine 812 can determining to: increase $C_{ACL}$ in response to increased workload sequentiality ($\Delta S > T_I$, where $T_I$ is a sequentiality increase threshold), increase $C_{ACL}$ in response increased workload sequentiality and decreased cache performance ($\Delta S > T_I$ and $M_R > T_{MR}$, where $M_R$ is the cache miss rate and $T_{MR}$ is a cache miss rate threshold), decrease $C_{ACL}$ in response to decreased workload sequentiality ($T_D > \Delta_S$, where $T_D$ is a sequentiality decrease threshold), decrease $C_{ACL}$ in response to decreased workload sequentiality and decreased cache performance ($T_D > \Delta S$ and $H_R < T_{HR}$, where $H_R$ is the cache hit rate and $T_{HR}$ is a cache hit rate threshold), and/or the like. Alternatively, or in addition, the determination of 1230 can be based on a processing task being performed by the computing device (and/or a processing task scheduled for execution). In some aspects, 1230 can include associating processing tasks with predicted workload characteristics and determining whether to modify the cache-line parameters 114 in accordance with the workload characteristics. By way of non-limiting example, the adaptation engine 812 can determine to modify the cache-line parameters 114 to increase cache-line prefetch in response to determining that a video editing processing task associated with highly-sequential workloads is scheduled for execution on the computing device, can determine to modify the cache-line parameters 114 to decrease cache-line prefetch in response to execution of a DMBS determined to produce non-sequential workloads, and/or the like.

In some aspects, modifying the cache-line parameters 114 may involve cache management overhead and/or result in disruption to caching services provided by the adaptive cache 110; e.g., may involve flushing the working set from the adaptive cache 110, reconfiguring the adaptive cache lines 132, and reloading the working set (or a portion thereof) into the reconfigured adaptive cache lines 132. Therefore, 1230 may include weighing estimated benefits from operation under modified cache-line parameters 114 against costs associated with reconfiguration of the adaptive cache 110. The operations of 1230 may include estimating benefits of operation under modified cache-line parameters 114, which may include simulating operation of the adaptive cache 110 under the modified cache-line parameters 114 (e.g., estimating cache hit rate and/or cache bandwidth consumption under the modified cache-line parameters 114). In some aspects, the determination at 1230 can be based on statistical characteristics of the cache metrics 814. The adaptation engine 812 may determine whether to modify the cache-line parameters 114 based on, inter alia, a variance of workload sequentiality. The adaptation engine 812 can determine to modify cache-line parameters 114 in response to workloads having stable sequentiality characteristics (low sequentiality variance) and can determine not to modify cache-line parameters 114 in response to workloads with higher sequentiality variance. Although examples of particular techniques for determining modifications to cache-line parameters 114 are described herein, the disclosure is not limited in this regard and could be adapted to determine and/or modify cache-line parameters 114 using any suitable mechanism.

If the determination at 1230 is to modify the cache-line parameters 114, the flow continues at 1240; otherwise, the adaptive cache 110 continues to operate under the first cache-line parameters 114 at 1210.

At 1240, the adaptive cache 110 is reconfigured to operate under second cache-line parameters 114. The second cache-line parameters 114 can include modified cache-line parameters 114 determined at 1230. The second cache-line parameters 114 may specify a second $C_{ACL}$ different from the first $C_{ACL}$ specified by the first cache-line parameters 114. In some aspects, 1240 further includes flushing the working set from the adaptive cache 110, which can include destaging respective adaptive cache lines 132 before reconfiguring the adaptive cache lines 132 (e.g., writing dirty adaptive cache lines 132 to the backing memory 109). Destaging an adaptive cache line 132 formed per the first cache-line parameters 114 may include performing a cache transfer 119 at a first granularity ($G_T$); e.g., transferring an amount of data corresponding to the first $C_{ACL}$ specified by the first cache-line parameters 114. In some aspects, the adaptive cache 110 is configured to retain information pertaining to the working set, such as addresses 106 (and/or address ranges) cached within the cache storage 120.

Reconfiguring the adaptive cache lines 132 in accordance with the second cache-line parameters 114 at 1240 may include forming adaptive cache lines 132 having a second $C_{ACL}$. The reconfigured adaptive cache lines 132 may be formed from respective groups of hardware cache lines 122, each group including a second quantity of hardware cache lines 122. Reconfiguring the adaptive cache lines 132 can further include forming adaptive sets 332, each including a respective group of adaptive cache lines 132, determining a set mapping scheme to map addresses 106 to respective adaptive sets 332, and so on; e.g., determining a scheme by which addresses 106 can be mapped to respective adaptive cache lines 132, which may include dividing addresses 106 into a tag region 224, set region 226, and offset region 228, as disclosed herein. In some aspects, 1240 further includes reconstructing the working set (and/or portions thereof), which may include transferring addresses 106 (and/or address ranges) of the working set into the reconfigured adaptive cache lines 132. Loading data into a reconfigured cache line 132 may include performing a cache transfer 119 at a second granularity (GT), which may include transferring an amount of data corresponding to the second $C_{ACL}$ specified by the second cache-line parameters 114 from the backing memory 109 to the adaptive cache 110.

Figure 13:
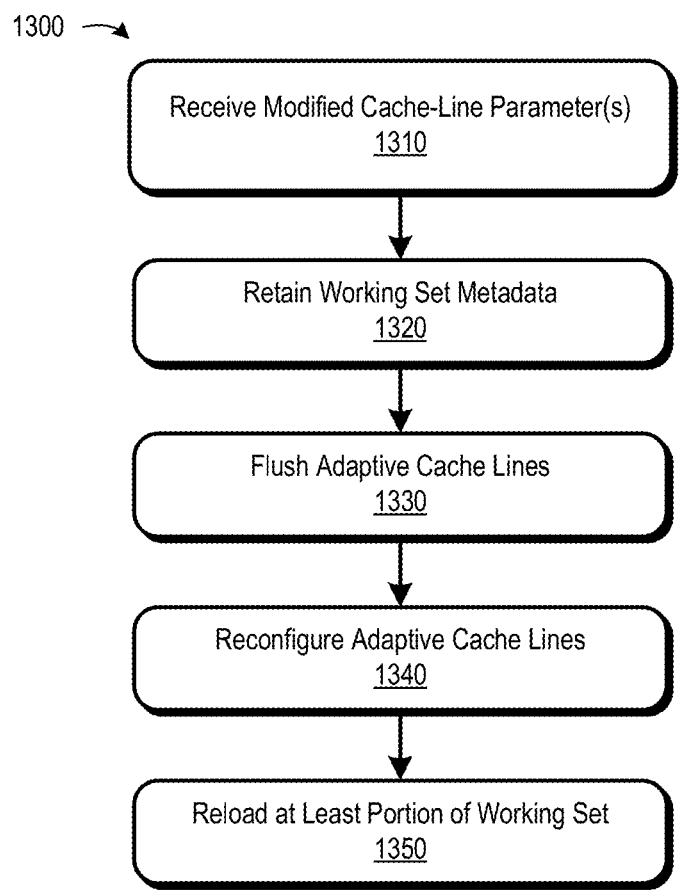
FIG. 13 illustrates an example flowchart depicting operations for managing the working set of an adaptive cache.

FIG. 13 illustrates an example flowchart 1300 depicting operations for managing the working set of an adaptive cache. At 1310, an adaptive cache 110 operating in accordance with specified cache-line parameters 114 receives modified cache line parameters 114. The modified cache-line parameters 114 may specify a different $C_{ACL}$ for the adaptive cache lines 132 (may include second cache-line parameters 114 specifying a second $C_{ACL}$ different from a first $C_{ACL}$ specified by first cache-line parameters 114 as currently configured). The modified cache-line parameters 114 can be received through any suitable technique or mechanism. Alternatively, the modified cache-line parameters 114 can be determined in response to monitoring cache metrics 814, as disclosed herein (e.g., can be determined based on characteristics of the workload on the adaptive cache 110).

Working set metadata pertaining to the working set of the adaptive cache 110 is retained at 1320. The working set metadata may specify addresses 106 (and/or address ranges) cached within respective adaptive cache lines 132 of the adaptive cache 110. The working set metadata can further include information pertaining to the respective address ranges, such as admission time, access metrics, access times, access frequency, and/or the like. The working set metadata can be retained in any suitable memory storage resource including, but not limited to memory storage of the adaptive cache 110 (e.g., a designated region of the cache storage 120, one or more registers, one or more hardware cache lines 122, and/or the like). Alternatively, the working set metadata can be retained in external memory storage, such as the backing memory 109 or the like.

The adaptive cache lines 132 can be flushed at 1330. The flushing can include writing the contents of dirty adaptive cache lines 132 to the backing memory 109 (and/or other backing store). The dirty adaptive cache lines 132 can be identified by use of ACL metadata 133 associated with the adaptive cache lines 132 (and/or HCL metadata 123 of the corresponding hardware cache lines 122). The flushing can further include marking the adaptive cache lines 132 (and/or corresponding hardware cache lines 122) as invalid or empty. In some aspects, 1330 further includes marking ACL tags 134 (and/or corresponding HCL tags 124) as invalid or empty.

At 1340, the adaptive cache lines 132 are reconfigured in accordance with the modified cache-line parameters 114, which may include grouping hardware cache lines 122 into respective adaptive cache lines 132 (reconfigured adaptive cache lines 132), as disclosed herein. The quantity of hardware cache lines 122 included in each adaptive cache line 132 may be based on an $C_{ACL}$ or aggregation ratio (R) specified by the modified cache-line parameters 114. The $C_{ACL}$ of the reconfigured adaptive cache lines 132 may differ from the $C_{ACL}$ of the adaptive cache lines 132 as previously configured (e.g., may have a second $C_{ACL}$ and/or include a second quantity of hardware cache lines 122 whereas the previously configured adaptive cache lines 132 had a first $C_{ACL}$ and/or included a first quantity of hardware cache lines 122).

At 1350, the controller 112 reloads at least a portion of the working set into the adaptive cache 110. The controller 112 may be configured to reload address ranges identified by the working set metadata retained at 1320 into the adaptive cache lines 132 as reconfigured at 1340. The extent of the address ranges may be adjusted in accordance with the $C_{ACL}$ of the reconfigured adaptive cache lines 132, which may differ from the $C_{ACL}$ of the adaptive cache lines 132 as previously configured. Where the $C_{ACL}$ of the adaptive cache lines 132 has been increased, 1350 may include extending selected address ranges (and excluding other address ranges). Address ranges to retain can be selected in accordance with a replacement or readmission policy, such as FIFO, LIFO, LRU, TLRU, MRU, LFU, random replacement, and/or the like. Where the $C_{ACL}$ of the adaptive cache lines 132 has been decreased, 1350 may include truncating selected address ranges (and loading additional address ranges). Address ranges may be truncated based on a truncation policy (e.g., based on intra-range access characteristics).

The additional address ranges may be selected to replace addresses 106 truncated from the selected address ranges. In some aspects, the controller 112 can be configured to reload a selected subset of the address ranges. The subset of the address ranges may be selected in accordance with a replacement or readmission policy, as disclosed herein. In some embodiments, the modified cache-line parameters 114 can specify an amount of the working set to be reloaded (e.g., reload 20% of the working set). The portion of the working set reloaded at 1350 may be selected in accordance with a readmission policy, as disclosed herein (e.g., may include reloading the 20% most frequently accessed address ranges of the working set). In some aspects, 1350 may be implemented concurrently while servicing requests 111 (e.g., in a background process). The reloading of 1350 can be paused in response to receiving a request 111 and resumed in response to servicing the request 111.

For the flow charts and flow diagrams described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, or some combination thereof. The methods may be realized using one or more of the apparatuses or components shown in FIGS. 1 through 8, the components of which may be further divided, combined, rearranged, and so on. The devices and components of these figures generally represent firmware or the actions thereof; hardware, such as electronic devices, packaged modules, IC chips, or circuits; software; or a combination thereof. The illustrated apparatuses include, for instance, a cache having configurable cache lines (an adaptive cache 110 having adaptive cache lines 132). The adaptive cache 110 can be coupled to a requestor 101, such as a client, computing device, computing system, host 102, processor 103, cache layer (e.g., LX cache 171), and/or the like. The adaptive cache 110 can also be coupled to a backing memory 109 (e.g., a memory, primary memory, main memory, a memory storage system 150, a memory device 152, RAM 154, NV memory 156, main memory 162, a cache layer 173, a memory storage device, an internal memory storage device, an external memory storage device, a remote memory storage device, a NAS device, and/or the like).

The adaptive cache 110 can include a cache controller (controller 112) and cache storage 120. The cache storage 120 can include a plurality of hardware cache lines 122 (and associated HCL tags 124). The hardware cache lines 122 and HCL tags 124 may be embodied within separate structures (e.g., separate memory elements). The hardware cache lines 122 (and/or HCL tags 124) can be arranged into respective hardware sets 322. In some aspects, the hardware cache lines 122 and/or HCL tags 124 can be banked across rows (e.g., the hardware sets 322 may be embodied and/or implemented on respective banks). The controller 112 can be configured to form adaptive cache lines 132 in accordance with cache-line parameters 114. The controller 112 can form adaptive cache lines 132 to have a specified capacity (a specified $C_{ACL}$), which may determine, inter alia, the granularity of cache transfers 119, cache-line prefetch of the adaptive cache 110, and so on. When the cache-line parameters 114 specify an adaptive cache-line size ($C_{ACL}$) less than or equal to the hardware cache-line size ($C_{HCL}$), the controller 112 can interleave adaptive cache lines 132 across respective rows or sets of hardware cache lines 122. When the cache-line parameters 114 specify an adaptive cache-line size ($C_{ACL}$) larger than the hardware cache-line size ($C_{HCL}$), the cache interface 214 can combine hardware cache lines 122 from a plurality of different groups (rows or sets).

The cache interface 214 can be configured to access ACL capacity 232 corresponding to the hardware cache lines 122 at least partially in parallel. The cache-line parameters 114 can specify a cache-line aggregation ratio (R) that is a power of 2 multiple (specify $C_{ACH}$ as a power of 2 multiple of $C_{HCL}$, and the controller 112 can form adaptive cache lines 132 from hardware cache lines 122 within respective R rows or sets, which can enable the cache interface 214 to access ACL capacity 232 of the adaptive cache lines 132 at least partially in parallel (across R rows or sets of hardware cache lines 122. The controller 112 can be further configured to form adaptive sets 332 and determine a set mapping scheme to associate addresses 106 with respective adaptive sets 332, which may include dividing addresses 106 into a tag region 224, a set region 226, and an offset region 228, as disclosed herein. The controller 112 can determine whether an address 106 is cached (results in a cache hit) by: (a) mapping the address 106 to a selected adaptive set 332 (based on the set region 226 thereof), and (b) comparing the address 106 to ACL tags 134 of respective ways of the adaptive set 332. The controller 112 can reconfigure the adaptive cache 110 in response to modified cache-line parameters 114. In some aspects, the controller 112 can determine modified cache-line parameters 114 in response to, inter alia, monitoring cache metrics 814, such as a sequentiality of the workload on the adaptive cache 110. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations for an adaptive cache (and/or adaptive cache lines) have been described in language specific to certain features and/or methods, the subject of the appended claims is not necessarily limited to the specific features or methods described. Rather, the specific features and methods are disclosed as example implementations of an adaptive cache.

What is claimed is:
1. An apparatus, comprising:
   a memory array configured as a plurality of hardware cache lines; and
   logic comprising a cache controller coupled to the plurality of hardware cache lines, the cache controller configured to:
   receive a parameter that indicates a cache line size;
   form, from the plurality of hardware cache lines, multiple cache lines having the cache line size indicated by the parameter, each cache line of the multiple cache lines comprising at least two of the hardware cache lines of the plurality of hardware cache lines;
   designate a tag of one of the at least two hardware cache lines of the cache line as a single tag; and
   disable or deactivate a tag of at least one other of the at least two hardware cache lines of the cache line.
2. The apparatus of claim 1, wherein:
   the at least two hardware cache lines from which each cache line of the multiple cache lines is formed comprises a quantity of the hardware cache lines; and
   the cache controller is further configured to determine the quantity of the hardware cache lines to include in each cache line based on the parameter that indicates the cache line size and a fixed capacity of each of the hardware cache lines from which the cache line is formed.

3. The apparatus of claim 2, wherein the cache controller is further configured to combine hardware cache lines of the at least two hardware cache lines embodied on different memory structures into respective ones of the cache lines such that the hardware cache lines of each of the respective cache lines are accessible at least partially in parallel.

4. The apparatus of claim 1, wherein the cache controller is further configured to:
monitor a workload associated with the memory array; and
set the parameter that indicates the cache line size based on the workload associated with the memory array.

5. The apparatus of claim 1, wherein the cache controller is further configured to perform a cache transfer operation to load data into a selected cache line, and wherein an amount of data retrieved from a backing memory in the cache transfer operation corresponds to the cache lines size indicated by the parameter.

6. The apparatus of claim 5, wherein the parameter is a first parameter that indicates a first cache line size, the cache transfer operation is a first cache transfer operation of first data, and cache controller is further configured to:
receive a second parameter that indicates a second cache line size, the second cache line size different from the first cache line size indicated by the first parameter;
reconfigure the multiple cache lines such that each cache line of the multiple cache lines has the second cache line size; and
perform a second cache transfer operation to load second data into one of the reconfigured cache lines, wherein an amount of the second data retrieved from the backing memory in the second cache transfer operation corresponds to the second cache line size indicated by the second parameter.

7. The apparatus of claim 6, wherein the cache controller is further configured to:
monitor a workload associated with the memory array; and
responsive to detecting an increase in a sequentiality of the workload associated with the memory array, set the second parameter to a second cache line size that is greater than the first cache line size of the first parameter; or
responsive to detecting a decrease in the sequentiality of the workload associated with the memory array, set the second parameter to a second cache line size that is less than the first cache line size of the first parameter.

8. A method, comprising:
receiving a parameter that indicates a cache line size;
forming multiple cache lines of a cache memory from hardware cache lines of the cache, each cache line of the multiple cache lines comprising a quantity of respective hardware cache lines, the quantity of hardware cache lines used to form each cache line based at least in part on the parameter that indicates the cache line size;
associating, for at least one cache line of the multiple cache lines, the respective hardware cache lines from which the cache line is formed with a single tag, the associating:
designating, for the at least one cache line of the multiple cache lines, a tag of one of the respective hardware cache lines from which the cache line is formed as the single tag of the cache line; and
disabling or deactivating a tag of at least one other of the respective hardware cache lines from which the cache line is formed; and
caching data of a backing memory within one or more of the multiple cache lines of the cache memory.

9. The method of claim 8, wherein:
the forming comprises combining hardware cache lines at a same index from two or more different banks of the cache memory to form respective ones of the multiple cache lines, and the method further comprises:
accessing a plurality of the hardware cache lines in parallel responsive at least in part to the plurality of hardware cache lines being combined to form a single cache line of the multiple cache lines of the cache memory.

10. The method of claim 8, further comprising:
monitoring a workload associated with the cache memory; and
setting the parameter that indicates the cache line size based on the workload associated with the cache memory.

11. The method of claim 8, wherein the parameter is a first parameter that indicates a first cache line size, the quantity of hardware cache lines is a first quantity of the hardware cache lines, and the method further comprises:
receiving a second parameter that indicates a second cache line size that is different from the first cache line size;
reconfiguring the multiple cache lines of the cache memory in response to receiving the second received parameter, the reconfigured multiple cache lines formed from multiple ones of the hardware cache lines, each reconfigured cache line comprising a second quantity of the hardware cache lines, the second quantity of hardware cache lines used to form each reconfigured cache line based at least in part on the second parameter that indicates cache line size; and
caching data of the backing memory within one or more of the reconfigured cache lines of the cache memory.

12. The method of claim 11, further comprising:
flushing a working set from the cache memory before reconfiguring the cache lines in response to receiving the second parameter; and
loading at least a portion of the working set into the reconfigured cache lines of the cache memory.

13. A system, comprising:
a memory array configured as a cache comprising a plurality of hardware sets, each hardware set comprising hardware cache lines at respective set indexes;
logic associated with the memory array and comprising a cache controller configured to:
form the hardware cache lines into multiple cache lines having a specified size, the cache lines comprising respective hardware cache lines at same set indexes within two or more different hardware sets of the plurality of hardware sets;
designate a tag of one of the respective hardware cache lines that form one of the cache lines of the multiple cache lines as a single tag of the one of the cache lines;
disable or deactivate a tag of at least one other of the respective hardware cache lines that form the one of the cache lines of the multiple cache lines; and enable access to the one of the respective hardware cache lines that form the one of the cache lines of the multiple cache lines at least partially in parallel.

14. The system of claim 13, wherein the cache controller is further configured to:
access a parameter that indicates a cache line size for each cache line of the multiple cache lines, the cache line size being a power-of-two multiple of a fixed size of each hardware cache line of the hardware cache lines; and
configure each of the multiple cache lines to include a quantity of the hardware cache lines, the quantity based on a ratio of the cache line size to the fixed size of each hardware cache line of the hardware cache lines.

15. The system of claim 14, wherein the cache controller is further configured to:
monitor a workload associated with the cache; and
set the parameter that indicates the cache line size based on the workload associated with the cache.

16. The system of claim 14, wherein the parameter is a first parameter, the cache line size is a first cache line size, the quantity of hardware caches lines is a first quantity, and the cache controller is further configured to:
access a second parameter that indicates a second cache line size; and
reconfigure the multiple cache lines such that each cache line includes a second quantity of hardware cache lines, the second quantity of hardware cache lines based at least in part on the second cache line size indicated by the second parameter.

17. The system of claim 16, wherein the cache controller is further configured to:
flush a working set from the cache in response to accessing the second parameter that indicates the second cache line size; and
reload at least a portion of the working set into the cache at least partly in response to the cache controller reconfiguring the multiple cache lines such that each cache line includes the second quantity of hardware cache lines.

18. The system of claim 16, wherein the cache line controller is further configured to:
monitor a workload associated with the cache; and
responsive to detecting an increase in a sequentiality of the workload associated with the cache, set the second parameter to a second cache line size that is greater than the first cache line size of the first parameter; or
responsive to detecting a decrease in the sequentiality of the workload associated with the cache, set the second parameter to a second cache line size that is less than the first cache line size of the first parameter.

* * * * *